United States Patent
Oshima et al.

(10) Patent No.: US 10,757,322 B2
(45) Date of Patent: *Aug. 25, 2020

(54) METHOD OF SETTING INITIAL POSITION OF CAMERA, CAMERA, AND CAMERA SYSTEM

(71) Applicant: FUJIFILM Corporation, Tokyo (JP)

(72) Inventors: Hiroyuki Oshima, Saitama (JP); Mikio Watanabe, Saitama (JP); Takeshi Misawa, Saitama (JP); Masaya Tamaru, Saitama (JP); Daisuke Hayashi, Saitama (JP); Fuminori Irie, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/407,415

(22) Filed: May 9, 2019

(65) Prior Publication Data

US 2019/0306410 A1 Oct. 3, 2019

Related U.S. Application Data

(63) Continuation of application No. 15/432,116, filed on Feb. 14, 2017, now Pat. No. 10,334,157, which is a
(Continued)

(30) Foreign Application Priority Data

Sep. 8, 2014 (JP) ................. 2014-182080

(51) Int. Cl.
*H04N 5/232* (2006.01)
*G06K 9/00* (2006.01)
(Continued)

(52) U.S. Cl.
CPC ....... *H04N 5/23219* (2013.01); *G03B 17/561* (2013.01); *G06K 9/00228* (2013.01);
(Continued)

(58) Field of Classification Search
CPC .. H04N 5/23219; H04N 7/18; H04N 5/23296; H04N 5/23293; H04N 5/23203;
(Continued)

(56) References Cited

U.S. PATENT DOCUMENTS 6,055,014 A 4/2000 Hosonuma et al.
6,507,366 B1 1/2003 Lee
(Continued)

FOREIGN PATENT DOCUMENTS

JP 7-92248 A 4/1995
JP 2007-67716 A 3/2007
(Continued)

OTHER PUBLICATIONS

English Translation of the International Preliminary Report on Patentability dated Mar. 14, 2017 in PCT/JP2015/068039.
(Continued)

*Primary Examiner* — Abdelaaziz Tissire
(74) *Attorney, Agent, or Firm* — Birch, Stewart, Kolasch & Birch, LLP

(57) ABSTRACT

In one aspect of the present invention, when reset of a camera is received, a pan motor and a tilt motor of a pan and tilt mechanism are rotated in a first preset rotation direction, and the pan and tilt mechanism is first moved to a pan reference position and a tilt reference position. Thereafter, the pan motor and the tilt motor are rotated in a second rotation direction opposite to the first rotation direction, and the pan and tilt mechanism is moved to an initial pan position and an initial tilt position. Using a movement of the pan and tilt mechanism to initial pan and tilt positions,
(Continued)

detection of a subject for automatic tracking is performed, and if the subject is detected, then transition to an automatic tracking state is caused to occur.

8 Claims, 13 Drawing Sheets

Related U.S. Application Data continuation of application No. PCT/JP2015/068039, filed on Jun. 23, 2015.

(51) Int. Cl.
| | |
|---|---|
| *H04N 7/18* | (2006.01) |
| *G03B 17/56* | (2006.01) |
| *G03B 15/16* | (2006.01) |
| *H04N 5/225* | (2006.01) |

(52) U.S. Cl.
CPC ......... *G06K 9/00362* (2013.01); *H04N 5/232* (2013.01); *H04N 5/23203* (2013.01); *H04N 5/23293* (2013.01); *H04N 5/23296* (2013.01); *H04N 7/18* (2013.01); *G03B 15/16* (2013.01); *H04N 5/2252* (2013.01)

(58) Field of Classification Search
CPC .. H04N 5/232; H04N 5/2252; H04N 5/23248; H04N 5/23216; H04N 3/155; G06K 9/00362; G06K 9/00228; G03B 17/561; G03B 15/16; G08B 13/1963; G08B 13/19689; G08B 13/19608; G09G 2320/068; F16M 11/02–18
See application file for complete search history.

(56) References Cited

U.S. PATENT DOCUMENTS

| | | | |
|---|---|---|---|
| 7,796,161 | B2 | 9/2010 | Oya |
| 2005/0057656 | A1* | 3/2005 | Chardon ............... H04N 5/2252 348/207.99 |
| 2007/0046784 | A1 | 3/2007 | Osaka |
| 2008/0158355 | A1* | 7/2008 | Jodan ................... H04N 5/2252 348/143 |
| 2008/0259159 | A1 | 10/2008 | Nystrom |
| 2010/0328467 | A1* | 12/2010 | Yoshizumi ........... H04N 5/2251 348/169 |
| 2012/0007999 | A1 | 1/2012 | Horii |
| 2012/0069223 | A1* | 3/2012 | Yamahata ............. G01S 3/7864 348/240.3 |
| 2012/0120267 | A1* | 5/2012 | Kuroda .................. F16M 11/10 348/211.9 |
| 2012/0306427 | A1* | 12/2012 | Kagei .................... F16M 11/18 318/638 |
| 2013/0162838 | A1* | 6/2013 | Huang .................... H04N 7/181 348/169 |
| 2014/0085491 | A1 | 3/2014 | Imai et al. |
| 2016/0094790 | A1* | 3/2016 | Yu ......................... G01S 3/7864 348/169 |
| 2016/0277662 | A1* | 9/2016 | Ashitani ................. H04N 5/232 |
| 2017/0150031 | A1* | 5/2017 | Oshima .................. G03B 17/02 |
| 2017/0155832 | A1* | 6/2017 | Oshima ............. H04N 5/23219 |
| 2017/0163881 | A1* | 6/2017 | Oshima .................. G03B 15/00 |
| 2017/0163899 | A1 | 6/2017 | Irie et al. |
| 2017/0180635 | A1* | 6/2017 | Hayashi ............. H04N 5/23203 |

FOREIGN PATENT DOCUMENTS

| | | |
|---|---|---|
| JP | 2008-141704 A | 6/2008 |
| JP | 2012-220769 A | 11/2012 |
| JP | 2014-68325 A | 4/2014 |

OTHER PUBLICATIONS

International Search Report for PCT/JP2015/068039 dated Sep. 1, 2015.
Written Opinion of the International Searching Authority for PCT/JP2015/068039 dated Sep. 1, 2015.

* cited by examiner

METHOD OF SETTING INITIAL POSITION OF CAMERA, CAMERA, AND CAMERA SYSTEM

CROSS-REFERENCE TO RELATED APPLICATIONS

This application is a Continuation of copending U.S. application Ser. No. 15/432,116 filed on Feb. 14, 2017, which is a Continuation of PCT International Application No. PCT/JP2015/068039 filed on Jun. 23, 2015, which claims priority under 35 U.S.C. § 119(a) to Japanese Patent Application No. 2014-182080 filed on Sep. 8, 2014. Each of the above applications is hereby expressly incorporated by reference, in their entirety, into the present application.

BACKGROUND OF THE INVENTION

1. Field of the Invention

The present invention relates to a method of setting an initial position of a camera, a camera, and a camera system, and particularly, to a technology suitable for automatic tracking of a subject that is a tracking target.

2. Description of the Related Art

Conventionally, a subject tracking device comprising photometric means for dividing a subject field into a plurality of photometric regions in a matrix form and outputting a plurality of pieces of photometric information regarding luminance of the subject field, subject detection means for detecting a main subject present in the subject field and a size thereof on the basis of the photometric information, tracking frame setting means for setting an initial value of a tracking frame for subject tracking on the basis of a result of the detection of the subject detection means, and subject tracking means for tracking the main subject in the subject field on the basis of the photometric information of the photometric region belonging to the tracking frame set by the tracking frame setting means, and the entire photometric information has been proposed (JP1995-92248A (JP-H07-92248A)).

According to this subject tracking device, it is possible to perform an initial setting of the tracking frame that is used for subject tracking without troubling a hand of a photographer.

Further, a communication device configured to be detachable from an imaging unit and comprising remote operation mode operation means that operates according to an operation command over a network, an autonomous mode operation means that operates according to an autonomous processing result of the communication device, and an operation mode switching means for switching between a remote operation mode operation and an autonomous mode operation has been proposed (JP2008-141704A).

Further, as described in JP2008-141704A, a face is detected from a captured image, and in a case where the number of detected faces reaches a predetermined number or in a case where a preset face of an individual is detected (in a case where individual is identified), switching from the remote operation mode to the autonomous mode occurs and tracking starts.

Further, JP2008-141704A describes that a camera is attached to and detached from a cradle comprising a pan and tilt mechanism (camera platform function), and describes a camera platform position is initialized to a home position according to crane setting data.

SUMMARY OF THE INVENTION

The technology for automatically setting an initial setting of the tracking frame used for subject tracking described in JP1995-92248A (JP-H07-92248A) on the basis of the photometry result is based on the premise that a subject that is a tracking target is present within an angle of view, and cannot be applied to a pan and tilt camera comprising a pan and tilt mechanism that rotates the imaging unit horizontally and vertically with respect to a camera body. JP1995-92248A (JP-H07-92248A) does not describe a pan and tilt camera.

On the other hand, in the device described in JP2008-141704A, when a plurality of faces are found, a face suitable for tracking cannot be recognized. Accordingly, certainty lacks. Further, in the case of personal authentication, it is necessary for face data to be registered in a camera in advance, which is troublesome. Further, in JP2008-141704A, initialization of a camera platform position to the home position is described, but tracking of a subject using an initialization operation is not described.

The present invention has been made in view of such circumstances, and an object thereof is to provide a method of setting an initial position of a camera which is capable of causing a camera to transition to an automatic tracking state in a short time without performing a useless pan and tilt operation at the time of reset of the camera in a camera capable of automatically tracking a subject, a camera, and a camera system.

In order to achieve the above object, an aspect of the present invention provides a method of setting an initial position of a camera, the camera including an imaging unit including an imaging lens and an imaging element, and a pan and tilt mechanism that rotates the imaging unit in a horizontal direction and a vertical direction with respect to a camera body, the method comprising: a step of rotating a pan motor and a tilt motor for driving the pan and tilt mechanism in a first preset rotation direction when a reset of the camera is received; a step of rotating the pan motor and the tilt motor in a second rotation direction opposite to the first rotation direction and moving the pan and tilt mechanism to a second pan position and a second tilt position when the pan and tilt mechanism reaches a first pan position and a first tilt position during driving of the pan motor and the tilt motor; a step of detecting a subject for automatic tracking on the basis of an image captured by the camera during a second movement of the pan and tilt mechanism from the first pan position to the second pan position and from the first tilt position to the second tilt position; and a step of repeatedly executing driving of the pan and tilt mechanism based on the detection of the subject and a result of the detection to automatically track the subject when the subject is detected during the second movement of the pan and tilt mechanism.

When the camera receives the reset, the camera rotates the pan motor and the tilt motor of the pan and tilt mechanism in the first preset rotation direction to first move the pan and tilt mechanism to the first pan position and the first tilt position. Further, the reset includes at least one of power ON reset when power is ON and reset due to an operation of a reset button or the like in a state in which power is ON.

The camera can recognize that the current position of the pan and tilt mechanism is the first pan position and the first tilt position due to the pan and tilt mechanism reaching the first pan position and the first tilt position. Thereafter, the pan motor and the tilt motor is rotated in the second rotation direction opposite to the first rotation direction and the pan and tilt mechanism is moved to the second pan position and the second tilt position. The second pan position and the second tilt position are initial positions of the pan and tilt mechanism in a case where the pan and tilt mechanism does not automatic tracking.

According to an aspect of the present invention, detection of the subject for automatic tracking is performed on the basis of the image captured by the camera using a movement (second movement) of the pan and tilt mechanism from the first pan position to the second pan position and from the first tilt position to the second tilt position. If the subject is detected during the second movement, then the detected subject is automatically tracked. Thus, if the subject is detected during the second movement, it is possible to perform transition to an automatic tracking state from a point in time of the detection, to omit a pan and tilt operation for detecting the subject that is usually performed after a movement to the initial position, and to cause the camera to transition to the automatic tracking state in a short time without performing a useless pan and tilt operation.

Another aspect of the present invention provides a method of setting an initial position of a camera, the camera including an imaging unit including an imaging lens and an imaging element, and a pan and tilt mechanism that rotates the imaging unit in a horizontal direction and a vertical direction with respect to a camera body, the method comprising: a step of rotating a pan motor and a tilt motor for driving the pan and tilt mechanism in a first preset rotation direction when a reset of the camera is received; a step of detecting a subject for automatic tracking on the basis of an image captured by the camera during a first movement of the pan and tilt mechanism until the pan and tilt mechanism reaches a first pan position and a first tilt position after receiving the reset; and a step of moving the pan and tilt mechanism to the first pan position and the first tilt position when the subject is detected during a first movement of the pan and tilt mechanism, moving the pan and tilt mechanism on the basis of a position at which the subject is detected, and then, repeatedly executing driving of the pan and tilt mechanism based on the detection of the subject and a result of the detection to automatically track the subject.

When the camera receives the reset, the camera rotates the pan motor and the tilt motor of the pan and tilt mechanism in the first preset rotation direction to first move the pan and tilt mechanism to the first pan position and the first tilt position.

According to another aspect of the present invention, the detection of the subject for automatic tracking is performed on the basis of the image captured by the camera using a movement (first movement) of the pan and tilt mechanism until the pan and tilt mechanism reaches the first pan position and the first tilt position after the reset is received. When the subject is detected during the first movement, the pan and tilt mechanism is moved to the first pan position and the first tilt position, the pan and tilt mechanism is moved to the position at which the subject is detected, and then, the detected subject is automatically tracked. Thus, if the subject is detected during the first movement, it is possible to cause transition to an automatic tracking state to occur by moving the pan and tilt mechanism to the first pan position and the first tilt position and then moving the pan and tilt mechanism to the position at which the subject is detected, and to omit a pan and tilt operation for detecting the subject that is usually performed after a movement to the initial position.

Since a relative position relationship (a movement amount in the pan direction and the tilt direction) between the pan position and the tilt position of the pan and tilt mechanism when the subject is detected and the first pan position and the first tilt position can be detected in a case where the subject is detected during the first movement, the pan and tilt mechanism can be moved in the first pan position and the first tilt position and then the pan and tilt mechanism can be moved to the position at which the subject is detected.

According to still another aspect of the present inventions provides a method of setting an initial position of a camera, the camera including an imaging unit including an imaging lens and an imaging element, and a pan and tilt mechanism that rotates the imaging unit in a horizontal direction and a vertical direction with respect to a camera body, the method comprising: a step of rotating a pan motor and a tilt motor for driving the pan and tilt mechanism in a first preset rotation direction when a reset of the camera is received; a step of detecting a subject for automatic tracking on the basis of an image captured by the camera during a first movement of the pan and tilt mechanism until the pan and tilt mechanism reaches a first pan position and a first tilt position after receiving the reset; a step of moving the pan and tilt mechanism to the first pan position and the first tilt position when the subject is detected during the first movement of the pan and tilt mechanism, moving the pan and tilt mechanism on the basis of a position at which the subject is detected, and then, repeatedly executing driving of the pan and tilt mechanism based on the detection of the subject and a result of the detection to automatically track the subject; a step of rotating the pan motor and the tilt motor in a second rotation direction opposite to the first rotation direction to move the pan and tilt mechanism to a second pan position and a second tilt position after the pan and tilt mechanism reaches a first pan position and a first tilt position when the subject is not detected during the first movement of the pan and tilt mechanism; a step of detecting a subject on the basis of an image captured by the camera during a second movement of the pan and tilt mechanism from the first pan position to the second pan position and from the first tilt position to the second tilt position when the subject is not detected during the first movement of the pan and tilt mechanism; and a step of repeatedly executing driving of the pan and tilt mechanism based on the detection of the subject and a result of the detection to automatically track the subject when the subject is detected during the second movement of the pan and tilt mechanism.

According to still another aspect of the present invention, the detection of the subject is performed using the movement (first movement) of the pan and tilt mechanism until the pan and tilt mechanism reaches the first pan position and the first tilt position after the reset is received and a movement (second movement) of the pan and tilt mechanism from the first pan position to the second pan position and from the first tilt position to the second tilt position. When the subject is detected during the first movement, the pan and tilt mechanism is moved to the first pan position and the first tilt position, and then, the pan and tilt mechanism is moved to the position at which the subject is detected to cause transition to an automatic tracking state. When the subject is not detected during the first movement but is detected during the second movement, it is possible to cause transition to an automatic tracking state to occur from a point in time of the detection. The first movement and the second movement are movements required to move the pan and tilt mechanism to the initial position after the reset is received.

It is preferable for a method of setting an initial position of a camera according to still another aspect of the present invention to further comprise: stopping the pan and tilt mechanism at the second pan position and the second tilt position when the subject is not detected during the second movement of the pan and tilt mechanism. This is because the second pan position and the second tilt position usually are positions at which the pan and tilt mechanism is caused to wait for after the reset.

It is preferable for a method of setting an initial position of a camera according to still another aspect of the present invention to further comprise: a step of moving the pan and tilt mechanism to the second pan position and the second tilt position when the subject is not detected during a second movement of the pan and tilt mechanism, continuously rotating only the pan motor in the second rotation direction, moving the pan and tilt mechanism from the second pan position to a third pan position, and detecting the subject on the basis of an image captured by the camera during a third movement of the pan and tilt mechanism from the second pan position to the third pan position; and a step of repeatedly executing driving of the pan and tilt mechanism based on the detection of the subject and a result of the detection to automatically track the subject when the subject is detected during the third movement of the pan and tilt mechanism.

Since the subject cannot be detected during the second movement, the subject is more highly likely to be detected when only the pan motor is continuously rotated in the second rotation direction and the pan and tilt mechanism is moved from the second pan position to the third pan position than when the detection of the subject is performed along substantially the same movement path as the second movement path. When the subject is detected during the movement (third movement) of the pan and tilt mechanism from the second pan position to the third pan position, it is possible to cause transition to an automatic tracking state to occur from a point in time of the detection.

It is preferable for a method of setting an initial position of a camera according to still another aspect of the present invention to further comprise: a step of moving the pan and tilt mechanism to the third pan position when the subject is not detected on the basis of an image captured by the camera during the third movement of the pan and tilt mechanism, rotating the tilt motor to change the pan and tilt mechanism from the second tilt position to the third tilt position, rotating the pan motor in the first rotation direction to move the pan and tilt mechanism from the third pan position to the first pan position, and detecting the subject on the basis of an image captured by the camera during a fourth movement of the pan and tilt mechanism from the third pan position to the first pan position and from the second tilt position to the third tilt position; and a step of repeatedly executing driving of the pan and tilt mechanism based on the detection of the subject and a result of the detection to automatically track the subject when the subject is detected during the fourth movement of the pan and tilt mechanism.

Since the subject cannot be detected during the second movement and the third movement of the pan and tilt mechanism, the pan and tilt mechanism is moved along a movement path of the fourth movement different from the second movement and the third movement, and when the subject is detected during the fourth movement, transition to the automatic tracking state is caused to occur from a point in time of the detection.

In a method of setting an initial position of a camera according to still another aspect of the present invention, the subject for automatic tracking is a face of a person, and the step of detecting a subject for automatic tracking includes detecting the face of the person from within the image captured by the camera.

In a method of setting an initial position of a camera according to still another aspect of the present invention, the subject for automatic tracking is a moving body, and the step of detecting a subject for automatic tracking includes detecting the moving body from the images continuously captured by the camera.

A camera according to still another aspect of the present invention comprises: an imaging unit including an imaging lens and an imaging element; a pan and tilt mechanism that rotates the imaging unit in a horizontal direction and a vertical direction with respect to a camera body; an input unit that receives reset; an image acquisition unit that operates the imaging unit to continuously acquire an image from the imaging unit when receiving the reset using the input unit; a subject detection unit that detects a subject for automatic tracking on the basis of the image acquired by the image acquisition unit; a first control unit that controls the pan and tilt mechanism to move the imaging unit to an initial position when receiving the reset using the input unit; and a second control unit that controls the pan and tilt mechanism to automatically track the subject on the basis of a position in the image of the subject detected by the subject detection unit, in which the first control unit rotates a pan motor and a tilt motor for driving the pan and tilt mechanism in a first preset rotation direction when receiving the reset using the input unit, rotates each of the pan motor and the tilt motor in a second rotation direction opposite to the first rotation direction to move the pan and tilt mechanism to a second pan position and a second tilt position when the pan and tilt mechanism reaches a first pan position and a first tilt position, and performs switching to automatic tracking by the second control unit when the subject detection unit detects the subject during a second movement of the pan and tilt mechanism from the first pan position to the second pan position and from the first tilt position to the second tilt position.

A camera according to still another aspect of the present invention comprises: an imaging unit including an imaging lens and an imaging element; a pan and tilt mechanism that rotates the imaging unit in a horizontal direction and a vertical direction with respect to a camera body; an input unit that receives reset; an image acquisition unit that operates the imaging unit to continuously acquire an image from the imaging unit when receiving the reset using the input unit; a subject detection unit that detects a subject for automatic tracking on the basis of the image acquired by the image acquisition unit; a first control unit that controls the pan and tilt mechanism to move the imaging unit to an initial position when receiving the reset using the input unit; and a second control unit that controls the pan and tilt mechanism to automatically track the subject on the basis of a position in the image of the subject detected by the subject detection unit, in which the first control unit rotates a pan motor and a tilt motor for driving the pan and tilt mechanism in a first preset rotation direction when receiving the reset using the input unit, moves the pan and tilt mechanism to a first pan position and a first tilt position when the subject detection unit detects the subject during a first movement of the pan and tilt mechanism until the pan and tilt mechanism reaches the first pan position and the first tilt position, moves the pan and tilt mechanism on the basis of a position at which the subject has been detected, and then, performs switching to automatic tracking by the second control unit.

A camera according to still another aspect of the present invention comprises: an imaging unit including an imaging lens and an imaging element; a pan and tilt mechanism that rotates the imaging unit in a horizontal direction and a vertical direction with respect to a camera body; an input unit that receives reset; an image acquisition unit that operates the imaging unit to continuously acquire an image from the imaging unit when receiving the reset using the input unit; a subject detection unit that detects a subject for automatic tracking on the basis of the image acquired by the image acquisition unit; a first control unit that controls the pan and tilt mechanism to move the imaging unit to an initial position when receiving the reset using the input unit; and a second control unit that controls the pan and tilt mechanism to automatically track the subject on the basis of a position in the image of the subject detected by the subject detection unit, in which the first control unit rotates a pan motor and a tilt motor for driving the pan and tilt mechanism in a first preset rotation direction when receiving the reset using the input unit, moves the pan and tilt mechanism to a first pan position and a first tilt position when the subject detection unit detects the subject during a first movement of the pan and tilt mechanism until the pan and tilt mechanism reaches the first pan position and the first tilt position, moves the pan and tilt mechanism on the basis of a position at which the subject has been detected, performs switching to automatic tracking by the second control unit, moves the pan and tilt mechanism to the first pan position and the first tilt position when the subject detection unit does not detect the subject during the first movement of the pan and tilt mechanism, rotates each of the pan motor and the tilt motor in a second rotation direction opposite to the first rotation direction to move the pan and tilt mechanism to a second pan position and a second tilt position, and performs switching to automatic tracking by the second control unit when the subject detection unit detects the subject during a second movement of the pan and tilt mechanism from the first pan position to the second pan position and from the first tilt position to the second tilt position.

In a camera according to still another aspect of the present invention, the pan motor and the tilt motor are a first stepping motor and a second stepping motor, respectively, the camera further comprises: a pan position detection unit that includes a first counter that up-down counts the number of pulses of a pulse signal of the first rotation direction and a pulse signal of a second rotation direction opposite to the first rotation direction to be applied to the first stepping motor, and detects a position in a pan direction of the pan and tilt mechanism on the basis of a count value of the first counter; and a tilt position detection unit that includes a second counter that up-down counts the number of pulses of a pulse signal of the first rotation direction and a pulse signal of a second rotation direction opposite to the first rotation direction to be applied to the second stepping motor, and detects a position in a tilt direction of the pan and tilt mechanism on the basis of a count value of the second counter, the pan position detection unit presets a count value of the first counter to a value that serves as a first preset reference value when the pan and tilt mechanism reaches the first pan position, and the tilt position detection unit presets a count value of the second counter to a second preset reference value when the pan and tilt mechanism reaches the first tilt position.

The first counter and the second counter count the number of pulses of the pulse signal that is applied to the first and second stepping motors corresponding to the pan motor and the tilt motor to detect the pan position and the tilt position of the pan and tilt mechanism, but when the reset is received, a process of returning an operating state of each unit to an initial state is performed, and the count values of the first counter and the second counter are also returned to an initial state. Therefore, the pan position detection unit including the first counter presets the count value of the first counter to the first preset reference value when the pan and tilt mechanism reaches the first pan position, and the tilt position detection unit including the second counter presets the count value of the second counter to the second preset reference value when the pan and tilt mechanism reaches the first tilt position. The count values of the first counter and the second counter after such presetting correspond to a current pan position and a current tilt position of the pan and tilt mechanism.

In a camera according to still another aspect of the present invention, the pan motor and the tilt motor are a first stepping motor and a second stepping motor, respectively, the camera further comprises: a pan position detection unit that includes a first counter that up-down counts the number of pulses of a pulse signal of the first rotation direction and a pulse signal of a second rotation direction opposite to the first rotation direction to be applied to the first stepping motor, and detects a position in a pan direction of the pan and tilt mechanism on the basis of a count value of the first counter; a tilt position detection unit that includes a second counter that up-down counts the number of pulses of a pulse signal of the first rotation direction and a pulse signal of a second rotation direction opposite to the first rotation direction to be applied to the second stepping motor, and detects a position in a tilt direction of the pan and tilt mechanism on the basis of a count value of the second counter; and a change amount storage unit that stores each of change amounts of count values of the first counter and the second counter until the pan and tilt mechanism reaches the first pan position and the first tilt position after the subject is detected when the subject detection unit detects the subject during the first movement of the pan and tilt mechanism, the pan position detection unit presets a count value of the first counter to a first preset reference value when the pan and tilt mechanism reaches the first pan position, the tilt position detection unit presets a count value of the second counter to a second preset reference value when the pan and tilt mechanism reaches the first tilt position, and when the subject detection unit detects the subject during the first movement of the pan and tilt mechanism, the first control unit presets the first counter and the second counter, and applies a pulse signal with the number of pulses corresponding to the change amount stored in the change amount storage unit to the pan motor and the tilt motor to move the pan and tilt mechanism to a position at which the subject is detected.

The change amount storage unit stores each of change amounts of count values of the first counter and the second counter until the pan and tilt mechanism reaches the first pan position and the first tilt position after the subject is detected when the subject detection unit detects the subject during the first movement of the pan and tilt mechanism. That is, the change amount storage unit stores movement amounts in the pan direction and the tilt direction of the pan and tilt mechanism until the pan and tilt mechanism reaches the first pan position and the first tilt position after the subject is detected during the first movement of the pan and tilt mechanism. When the pan and tilt mechanism reaches the first pan position and the first tilt position and the count values of the first counter and the second counter are preset to the first reference value and the second reference value, respectively, the position control of the pan and tilt mechanism can be performed, and the pulse signal with the number of pulses corresponding to the change amount stored in the change amount storage unit is applied to the pan motor and the tilt motor so that the pan and tilt mechanism is moved to the position at which the subject is detected.

A camera system according to still another aspect of the present invention comprises: the above-described camera; and a remote operation device wirelessly or wiredly connected to the camera to remotely operate the camera, the remote operation device including a live view image acquisition unit that acquires a live view image from the camera, a display unit that displays the live view image acquired by the live view image acquisition unit, an operation unit that manually operates the pan and tilt mechanism, a motor driving instruction output unit that outputs a motor driving instruction to the pan motor and the tilt motor of the pan and tilt mechanism on the basis of the manual operation of the operation unit, and an imaging instruction unit that outputs an imaging instruction for a still image or a moving image to the camera.

According to still another aspect of the present invention, it is possible to remotely operate the camera (for example, manual operation and imaging instruction for the pan and tilt mechanism) while viewing the live view image displayed on the display unit. In particular, in a case where the camera transitions to the automatic tracking state, it is possible to immediately perform the imaging instruction without manually operating the pan and tilt mechanism.

According to the present invention, in a case where the reset of the camera is received and the pan and tilt mechanism is moved to the initial position, the detection of the subject for automatic tracking starts using the movement to the initial position, and when the subject is detected, the camera transitions to the automatic tracking state. Thus, it is possible to cause the camera to transition to the automatic tracking state in a short time without performing a useless pan and tilt operation.

DESCRIPTION OF THE PREFERRED EMBODIMENTS

Hereinafter, embodiments of a method of setting an initial position of a pan and tilt camera, a pan and tilt camera, and a pan and tilt camera system according to the present invention will be described with reference to the accompanying drawings.

[Pan and Tilt Camera System]

Figure 1:
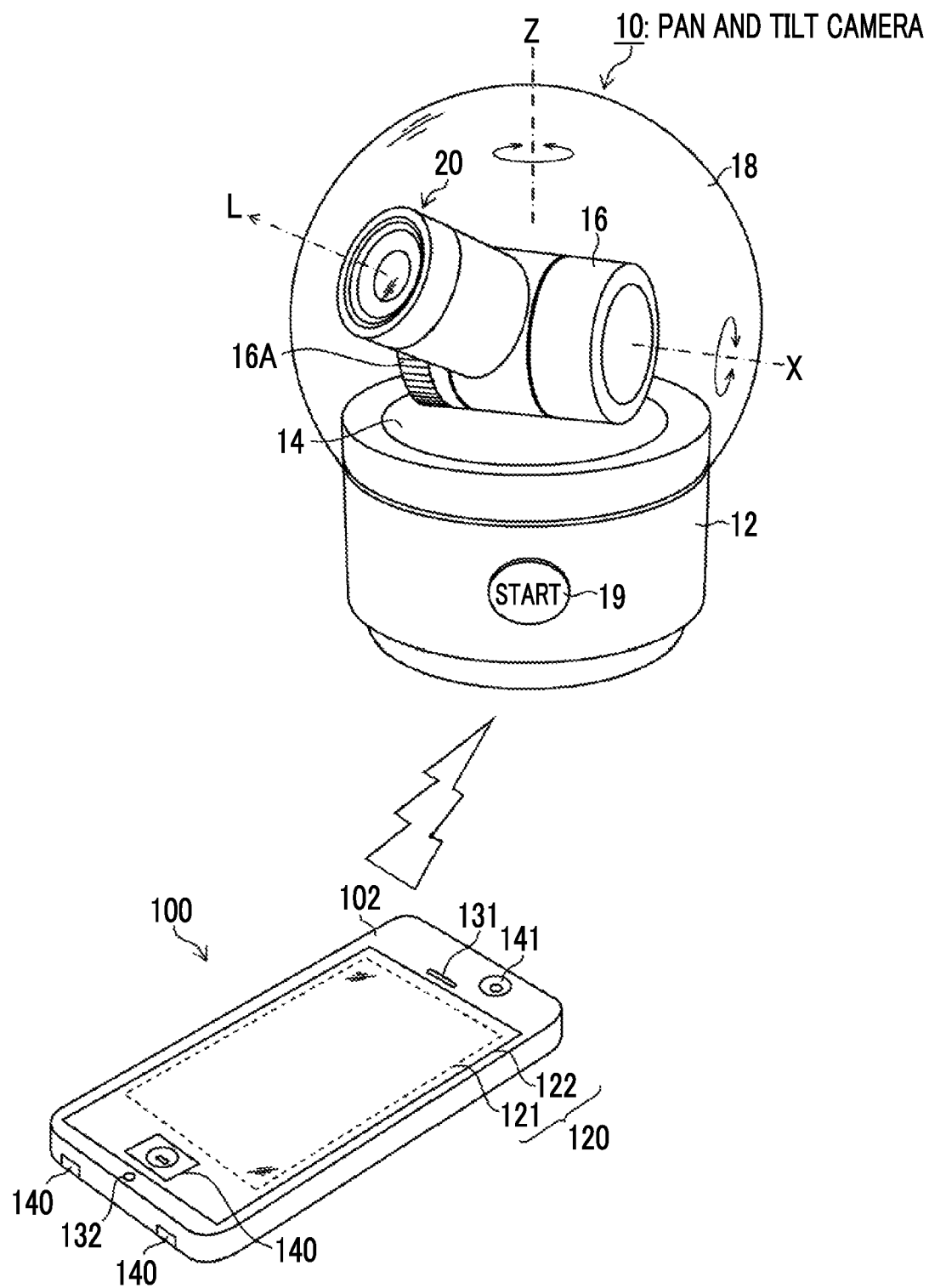
FIG. 1 is a perspective view illustrating an appearance of a pan and tilt camera system according to the present invention.

FIG. 1 is a perspective view illustrating an appearance of a pan and tilt camera system according to the present invention.

The pan and tilt camera system illustrated in FIG. 1 includes a pan and tilt camera 10, and a remote operation device (a smartphone in this example) 100.

<Pan and Tilt Camera>

The pan and tilt camera 10 illustrated in FIG. 1 mainly includes a camera body 12, a pedestal 14, a holding portion 16 that is fixed to the pedestal 14 and rotatably holds an imaging unit 20, and a dome cover 18 that covers the imaging unit 20.

Figure 2:
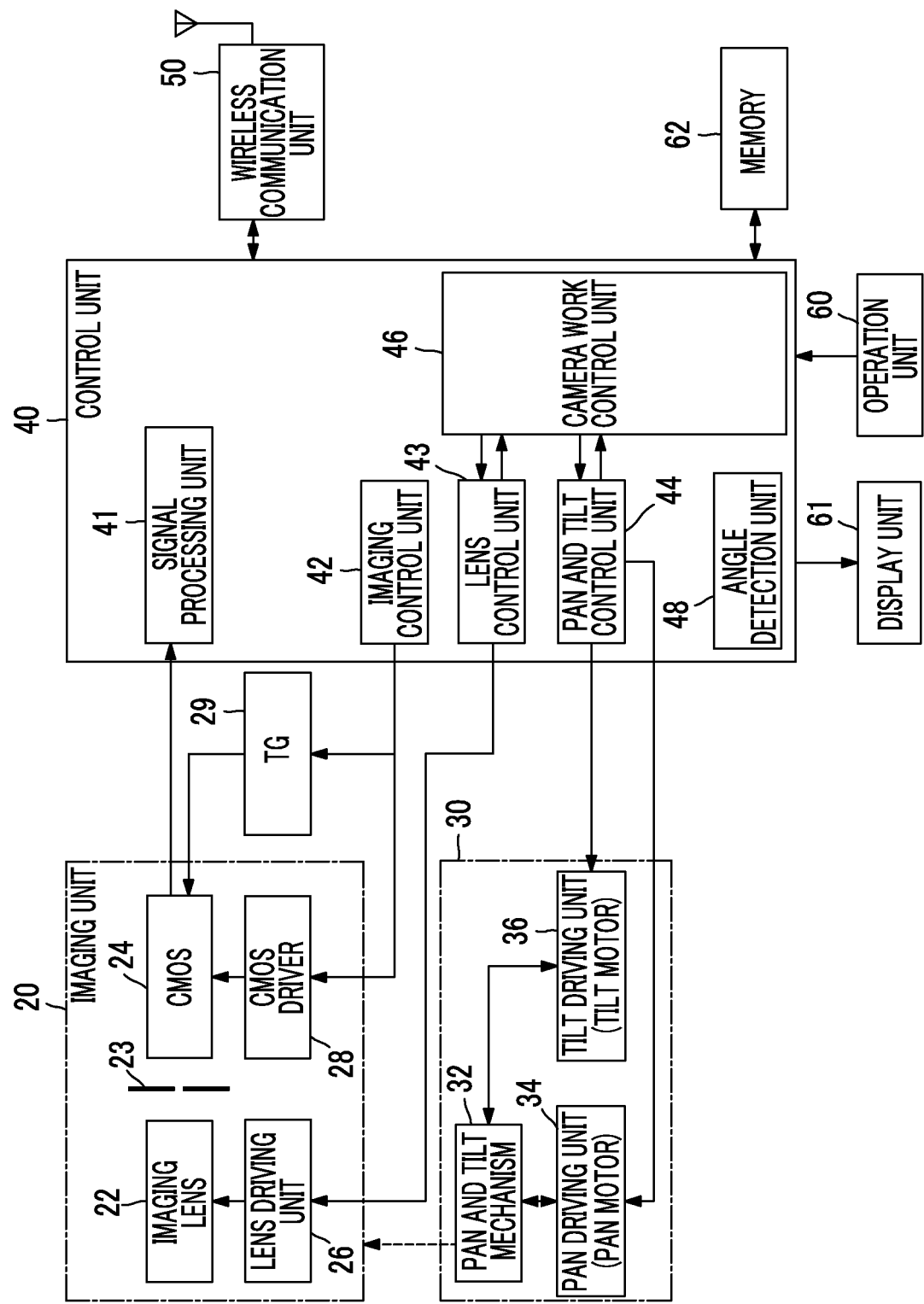
FIG. 2 is a block diagram illustrating an embodiment of an internal configuration of the pan and tilt camera illustrated in FIG. 1.

The pedestal 14 is disposed to be rotatable about an axis in a vertical direction Z of the camera body 12, and is rotated about the axis in the vertical direction Z by a pan driving unit 34 (FIG. 2).

The holding portion 16 includes a gear 16A provided coaxially with an axis in a horizontal direction X, and rotates the imaging unit 20 in an up and down direction (a tilt operation) using a driving force transmitted from a tilt driving unit 36 (FIG. 2) through the gear 16A.

The dome cover 18 is a cover for dust-proof and drip-proof, and is preferably a spherical shell shape having a constant thickness, which has an intersection between an axis in the horizontal direction X and an axis in the vertical direction Z as a center of curvature so that optical performance of the imaging unit 20 does not change regardless of an optical axis direction L of the imaging unit 20.

Further, it is preferable for a tripod attachment portion (for example, tripod screw hole) (not illustrated) to be provided on a rear surface of the camera body 12.

An imaging start button 19 for instructing imaging start, a power switch, a reset button (not illustrated), a wireless communication unit 50 (FIG. 2), and the like are provided in the pan and tilt camera 10, and the pan and tilt camera 10 performs wireless communication with the smartphone 100 via the wireless communication unit 50 to receive various operation instruction signals from the smartphone 100 and transmit, for example, image data indicating a captured live view image to the smartphone 100.

FIG. 2 is a block diagram illustrating an embodiment of an internal configuration of the pan and tilt camera 10.

This pan and tilt camera 10 can capture a still image and a moving image, and roughly includes the imaging unit 20, a pan and tilt device 30, a control unit 40, and the wireless communication unit 50.

The imaging unit 20 includes, for example, an imaging lens 22 and an imaging element 24. The imaging lens 22 includes a single focus lens or a zoom lens, and forms a subject image on an imaging surface of the imaging element 24. A focus lens, a variable magnification lens (in the case of a zoom lens), and a diaphragm 23 included in the imaging lens 22 is driven by a lens driving unit 26.

The imaging element 24 in this example is a color imaging device in which primary color filters of three primary colors including red (R), green (G), and blue (B) are arranged in each pixel in a predetermined pattern (for example, a Bayer array, G stripe R/G full checkered, an X-Trans (registered trademark) array, or a honeycomb array), and includes a complementary metal oxide semiconductor (CMOS) type image sensor. The imaging element 24 is not limited to the CMOS image sensor and may be a charge coupled device (CCD) type image sensor.

The imaging element 24 is driven by a CMOS driver 28 including, for example, a vertical driver and a horizontal driver, and a timing generator (TG) 29. From the imaging element 24, a pixel signal according to an incident light amount of subject light (a digital signal corresponding to signal charge accumulated in each pixel) is read.

The pan and tilt device 30 includes, for example, a pan mechanism that rotates the imaging unit 20 with respect to the camera body 12 in a horizontal direction (pan direction), and a tilt mechanism that rotates the imaging unit 20 in a vertical direction (tilt direction) (hereinafter referred to as a "pan and tilt mechanism") 32, a pan driving unit 34, and a tilt driving unit 36, as illustrated in FIG. 1. The pan and tilt mechanism 32 includes a home position sensor (for example, a proximity switch) that detects a reference position in the pan direction, and a home position sensor that detects a reference position in the tilt direction.

The pan driving unit 34 and the tilt driving unit 36 include a pan motor and a tilt motor respectively including a first stepping motor and a second stepping motor, and drivers that drive the motors, respectively, and outputs a driving force to the pan and tilt mechanism 32 to drive the pan and tilt mechanism 32.

The control unit 40 mainly includes a signal processing unit 41, an imaging control unit 42, a lens control unit 43, a pan and tilt control unit 44, a camera work control unit 46, and an angle detection unit 48.

The signal processing unit 41 performs signal processing such as offset processing, a gain control process including white balance correction and sensitivity correction, a gamma correction process, demosaic processing (demosaicing process), and RGB/YC conversion process on a digital image signal input from the imaging unit 20. Here, the demosaic processing is a process of calculating all of color information for each pixel from a mosaic image corresponding to a color filter array of a single plate type color imaging element, and is also referred to as a synchronization process. For example, in the case of an imaging element including color filters for three colors including RGB, the demosaic processing is a process of calculating color information of all of RGB for each pixel from a mosaic image consisting of RGB. Further, the RGB/YC conversion process is a process of generating luminance data Y and color difference data Cb and Cr from RGB image data subjected to demosaic processing.

The imaging control unit 42 is a unit that instructs discharge of charge accumulated in a capacitor of each pixel of the imaging element 24 via the CMOS driver 28 and the TG 29 or reading of a signal corresponding to the charge accumulated in the capacitor, and performs imaging control of a still image or a moving image.

The lens control unit 43 is a unit that controls the focus lens, the variable magnification lens, and the diaphragm 23 included in the imaging lens 22 via the lens driving unit 26, and performs, for example, autofocus (AF) control to move the focus lens to a focusing position. The AF control is performed by integrating an absolute value of a high-frequency component of the digital signal corresponding to the AF area, detecting the focusing position at which the integrated value (AF evaluation value) is maximized, and moving the focus lens to the detected focusing position.

The pan and tilt control unit 44 is a unit that controls the pan and tilt device 30, and outputs a motor driving instruction input from the smartphone 100 via the wireless communication unit 50 and the camera work control unit 46 (motor driving instruction input unit), to the pan driving unit 34 and the tilt driving unit 36 of the pan and tilt mechanism 32.

The camera work control unit 46 outputs an instruction signal for controlling the lens control unit 43 and the pan and tilt control unit 44 in order to realize imaging of a desired still image or moving image.

The angle detection unit 48 corresponds to the pan position detection unit and the tilt position detection unit, and is a unit that detects a pan angle (pan position) of the pan and tilt mechanism 32 and a tilt angle (tilt position). Details of the angle detection unit 48 will be described below.

The wireless communication unit 50 is a unit that performs wireless communication with, for example, the smartphone 100 illustrated in FIG. 1. The wireless communication unit 50 constitutes a wireless local area network (LAN) with an access point (for example, the smartphone 100 or a router), receives various instruction inputs for operations from the smartphone 100 through wireless communication, and transmits information indicating a pan angle and a tilt angle detected by the angle detection unit 48 to the smartphone 100. Further, the wireless communication unit 50 can transmit a moving image (live view image) captured by the imaging unit 20 and processed by the signal processing unit 41 to the smartphone 100, and transmit a still image or a moving image captured by the imaging unit 20 to the smartphone 100. Thus, it is possible to record the captured still image or moving image in an internal recording medium of the smartphone 100 or an external recording medium (recording unit) or display the live view image in the display panel 121 of the smartphone 100.

The operation unit 60 (input unit) includes, for example, an imaging start button 19 provided in the camera body 12 (FIG. 1), a power switch, and a reset button, and can perform an instruction input for the same operation as an instruction input for an operation from the smartphone 100.

The display unit 61 functions as a display unit that displays a live view image, a played image, or the like, and functions as a user interface (UI unit) for displaying a menu screen and setting and inputting various parameters in cooperation with an operation unit 60.

The memory 62 includes a recoding unit such as a synchronous dynamic random access memory (SDRAM) including a storage area that temporarily stores a captured moving image, and a work area in which various calculation processes are performed, a read only memory (ROM) in which, for example, a program for imaging and various data necessary for control are stored, or a flash ROM that records the captured moving image.

Further, the control unit 40 includes an image acquisition unit that operates the imaging unit 20 via the imaging control unit 42 to continuously acquire images from the imaging unit 20 when receiving the reset (power ON reset by ON of the power switch or reset by an operation of the reset button) through the operation unit 60, a subject detection unit that detects a subject for automatic tracking on the basis of the image acquired by the image acquisition unit, a first control unit that controls the pan and tilt mechanism to move the imaging unit 20 to an initial position 32 when receiving the reset through the operation unit 60, and a second control unit that controls the pan and tilt mechanism 32 on the basis of a position in the image of the subject detected by the subject detection unit to automatically track the subject.

The subject detection unit detects a face of a person from within the captured image on the basis of the image continuously acquired by the image acquisition unit in a case where the subject for automatic tracking is a face of a person, or detects a moving body on the basis of the image continuously acquired by the image acquisition unit in a case where the subject for automatic tracking is a moving body.

In a case where the subject detection unit detects a face of a person, the subject detection unit registers features of faces of persons as a face dictionary in advance, and recognizes (detects) faces while comparing an image cut from the captured image while changing a position or size thereof with the face dictionary. In a case where the subject detection unit detects a face of a person, it is preferable to facilitate detection of the face by using a small diaphragm as the diaphragm 23 of the imaging unit 20 and pan focus feeling.

Further, in a case where the subject detection unit detects a moving body, the subject detection unit detects a difference image obtained by taking a difference between the two consecutively captured images in the time series, and detects a centroid of the difference image as a position of the moving body. In a case where the imaging unit 20 is moved by the pan and tilt mechanism 32, a background also moves between the images in the time series, but in this case, the image is shifted so that the backgrounds match between the images in the time series and a difference image between the images after the shift is taken. Accordingly, it is possible to detect the moving body that moves in a real space regardless of the movement of the imaging unit 20.

When the first control unit included in the control unit 40 receives the reset through the operation unit 60, the first control unit controls the pan and tilt mechanism 32 to move the imaging unit 20 to the initial position, and details thereof will be described below.

Further, the second control unit included in the control unit 40 is an automatic tracking control unit that controls the pan operation and the tilt operation of the pan and tilt mechanism 32 so that the subject is located at a center of the captured image, on the basis of the position in the image of the subject detected by the subject detection unit in the case of the automatic tracking state.

[Remote Operation Device]

Next, the smartphone 100 will be described.

In this example, a smartphone 100 in which a remote operation program is installed in a general-purpose smartphone functions as a remote operation device, as illustrated in FIG. 1.

Figure 3:
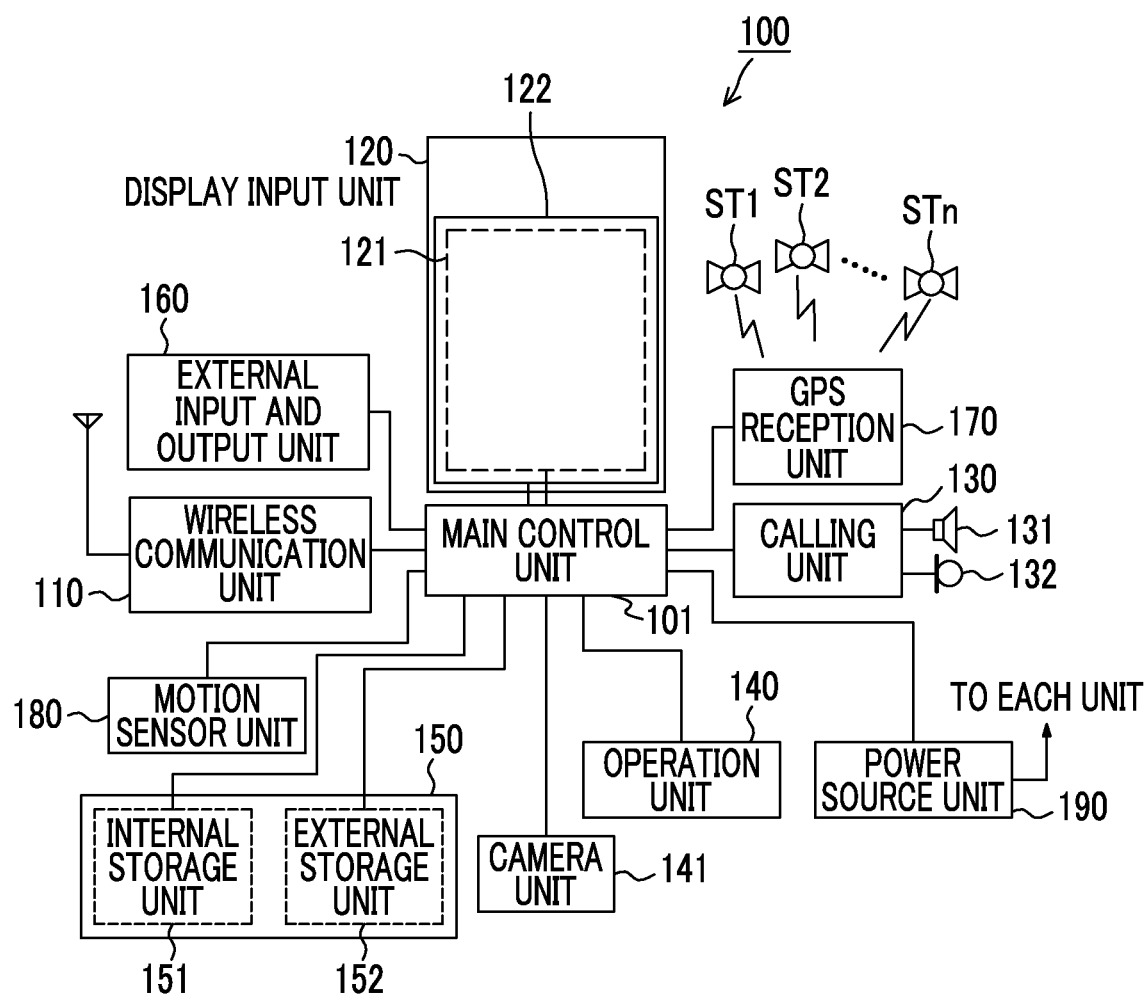
FIG. 3 is a block diagram illustrating a configuration of a smartphone illustrated in FIG. 1.

FIG. 3 is a block diagram illustrating a configuration of the smartphone 100 illustrated in FIG. 1.

As illustrated in FIG. 3, the smartphone 100 include, as main components of the smartphone 100, a wireless communication unit 110, a display input unit (touch panel) 120, a calling unit 130, an operation unit 140, a camera unit 141, a storage unit 150, an external input and output unit 160, a global positioning system (GPS) reception unit 170, a motion sensor unit 180, a power supply unit 190, and a main control unit 101. Further, a main function of the smartphone 100 includes a wireless communication function of performing mobile wireless communication with a base station device BS over a mobile communication network NW.

The wireless communication unit 110 performs wireless communication with the base station device BS accommodated in the mobile communication network NW according to an instruction of the main control unit 101. Using this wireless communication, the wireless communication unit 110 performs transmission and reception of various types of file data such as audio data and image data, e-mail data, or the like, or reception of web data, streaming data, or the like. In this example, the wireless communication unit 110 (live view image acquisition unit) of the smartphone 100 constitutes a wireless LAN between a station (for example, a pan and tilt camera 10) and an access point (for example, a router), and transmits an instruction input for various operations to the pan and tilt camera 10 or receives a live view image, still and moving images for recording, or the like from the pan and tilt camera 10.

The touch panel 120 is a touch panel that displays a live view image, text information, or the like to visually deliver information to a user and detects a user operation for the displayed information under the main control unit 101. The touch panel 120 includes a display panel 121 (display unit) and an operation panel 122 (operation unit). In a case where a 3D image is viewed, it is preferable for the display panel 121 to be a 3D display panel.

The display panel 121 uses a liquid crystal display (LCD), an organic electro-luminescence display (OELD), or the like as a display device.

The operation panel 122 is a device that is placed so that an image displayed on a display surface of the display panel 121 can be viewed, and detects one or a plurality of coordinates operated by a finger of a user or a stylus. If this device is operated by the finger of the user or the stylus, the operation panel 122 outputs a detection signal generated by the operation to the main control unit 101. Then, the main control unit 101 detects an operation position (coordinates) on the display panel 121 on the basis of the received detection signal.

The display panel 121 and the operation panel 122 of the smartphone 100 are formed integrally to constitute the touch panel 120 as illustrated in FIG. 1, but the operation panel 122 is arranged to completely cover the display panel 121. In a case where this arrangement is adopted, the operation panel 122 may have a function of detecting a user operation in an area outside the display panel 121. In other words, the operation panel 122 may include a detection area (hereinafter referred to as a display area) for an overlapping portion that overlaps the display panel 121, and a detection area (hereinafter referred to as a non-display area) for an outer edge portion that does not overlap the display panel 121, other than the display area.

A size of the display area and a size of the display panel 121 fully match, but it is not always necessary for both to match. Further, the operation panel 122 may include two sensitive areas including an outer edge portion and an inner portion other than the outer edge portion. Further, a width of the outer edge portion is appropriately designed according to, for example, a size of a housing 102. Further, a position detection scheme adopted in the operation panel 122 may include a matrix switch scheme, a resistance film type, a surface acoustic wave scheme, an infrared scheme, an electromagnetic induction scheme, an electrostatic capacitance scheme, and the like, and any of the schemes may be adopted.

The calling unit 130 includes a speaker 131 or a microphone 132. The calling unit 130 converts voice of the user input via the microphone 132 into audio data which can be processed by the main control unit 101 and outputs the audio data to the main control unit 101, or decodes the audio data received by the wireless communication unit 110 or the external input and output unit 160 and outputs the audio data from the speaker 131. Further, as illustrated in FIG. 1, for example, the speaker 131 and the microphone 132 may be mounted on the same surface as the surface in which the touch panel 120 is provided.

The operation unit 140 is a hardware key using a key switch or the like, and receives an instruction from the user. For example, the operation unit 140 is a push button switch that is mounted on a lower surface in a lower portion of a display portion of the housing 102 of the smartphone 100, and is turned ON when pressed by a finger or the like and turned OFF due to a restoring force of a spring or the like when the finger is released.

The storage unit 150 stores a control program or control data of the main control unit 101, address data associated with, for example, a name or a telephone number of a communication partner, transmitted and received e-mail data, web data downloaded by web browsing, or downloaded content data, and temporarily stores streaming data or the like. The storage unit 150 includes an internal storage unit 151 built in the smartphone and an external storage unit 152 having a slot for a detachable external memory. Each of the internal storage unit 151 and the external storage unit 152 constituting the storage unit 150 is realized using a storage medium, such as a flash memory type, hard disk type, multimedia card micro type, or card type of memory (for example, a Micro SD (registered trademark) memory), a random access memory (RAM), or a read only memory (ROM).

The external input and output unit 160 serves as an interface with all of external devices connected to the smartphone 100, and is directly or indirectly connected with other external devices through, for example, communication (for example, Universal Serial Bus (USB) or IEEE1394) or a network (for example, the Internet, wireless LAN, Bluetooth (registered trademark), radio frequency identification (RFID), infrared communication (infrared Data Association: IrDA; registered trademark), UWB (Ultra Wideband; registered trademark), or ZigBee (registered trademark)).

Examples of the external device connected to the smartphone 100 include a wired/wireless headset, a wired/wireless external charger, a wired/wireless data port, a memory card or a subscriber identity module card (SIM)/user identity module card (UIM) connected via a card socket, an external audio and video device connected via an audio and video input/output (I/O) terminal, a wirelessly connected external audio and video device, a wiredly/wirelessly connected smartphone, a wiredly/wirelessly connected personal computer, a wiredly/wireless connected PDA, and a wiredly/wireless connected earphone. The external input and output unit can transfer data received from such an external device to each component inside the smartphone 100, or send internal data of the smartphone 100 to the external device.

The GPS reception unit 170 receives GPS signals that are transmitted from GPS satellites ST1 to STn, executes a positioning calculation process based on a plurality of received GPS signals, and detects a position including a latitude, a longitude, and an altitude of the smartphone 100 according to an instruction of the main control unit 101. When the GPS reception unit 170 can acquire position information from the wireless communication unit 110 or the external input and output unit 160 (for example, wireless LAN), the GPS reception unit 170 can also detect the position using the position information.

The motion sensor unit 180 includes, for example, a triaxial acceleration sensor, and detects a physical motion of the smartphone 100 according to an instruction of the main control unit 101. By detecting a physical movement of the smartphone 100, a movement direction or an acceleration of the smartphone 100 is detected. A result of the detection is output to the main control unit 101.

The power supply unit 190 supplies power accumulated in a battery (not illustrated) to each unit of the smartphone 100 according to an instruction of the main control unit 101.

The main control unit 101 includes a microprocessor. The main control unit 101 operates according to the control program or the control data stored in the storage unit 150 and generally controls each unit of the smartphone 100. Further, the main control unit 101 has a mobile communication control function of controlling each unit of a communication system, and an application processing function in order to perform audio communication or data communication through the wireless communication unit 110.

The application processing function is realized by the main control unit 101 operating according to application software stored in the storage unit 150. Examples of the application processing function include an infrared communication function of controlling the external input and output unit 160 and performing data communication with a facing device, an e-mail function of performing transmission and reception of an e-mail, and a web browsing function of viewing web pages.

Further, the main control unit 101 has an image processing function of, for example, displaying a video on the touch panel 120 on the basis of image data (data of a moving image) such as received data or downloaded streaming data. The image processing function refers to a function of the main control unit 101 decoding the image data, performing image processing on a result of the decoding, and displaying the image on the touch panel 120.

Further, the main control unit 101 executes display control for the display panel 121, and an operation detection control for detecting a user operation through the operation unit 140 or the operation panel 122.

Through the execution of the display control, the main control unit 101 displays an icon for starting up the application software or a software key such as a scroll bar, or displays a window for creating an e-mail. The scroll bar refers to a software key for receiving an instruction for moving an image display portion for a large image that cannot be fitted in the display area of the display panel 121.

Further, through the execution of the operation detection control, the main control unit 101 detects a user operation through the operation unit 140, or receives an operation for the icon or an input of a character string to an input field of the window or receives a request for scroll of a display image using the scroll bar via the operation panel 122.

Further, the main control unit 101 has a touch panel control function of determining whether an operation position for the operation panel 122 is the overlapping portion (display area) that overlaps the display panel 121 or the outer edge portion (non-display area) that does not overlap the display panel 121, other than the overlapping portion, and controlling the sensitive area of the operation panel 122 or a display position of the software key, through the execution of the operation detection control.

Further, the main control unit 101 can also detect a gesture operation for the operation panel 122, and execute a preset function according to the detected gesture operation. The gesture operation refers to an operation of drawing a trajectory with a finger or the like, designating a plurality of positions simultaneously, or combining these and drawing a trajectory for at least one of a plurality of positions, rather than a conventional simple touch operation.

The camera unit 141 is a digital camera that performs electronic imaging using an imaging element such as a complementary metal oxide semiconductor (CMOS) or a charge-coupled device (CCD).

Further, the camera unit 141 can convert the image data obtained through imaging into, for example, compressed image data such as joint photographic coding experts group (JPEG), and record the compressed image data in the storage unit 150 or output the compressed image data via the external input and output unit 160 or the wireless communication unit 110 under the control of the main control unit 101.

In the smartphone 100 illustrated in FIG. 1, the camera unit 141 is mounted on the same surface as the touch panel 120, but a mounting position of the camera unit 141 is not limited thereto and may be mounted on a back surface of the touch panel 120. Alternatively, a plurality of camera units 141 may be mounted. In a case where the plurality of camera units 141 are mounted, switching to the camera unit 141 provided for imaging may be performed and imaging may be performed using only such a camera unit 141, or imaging may be performed using the plurality of camera units 141 at the same time.

Further, the camera unit 141 can be used for various functions of the smartphone 100. For example, the image acquired by the camera unit 141 can be displayed on the display panel 121, or the image of the camera unit 141 can be used as one operation input of the operation panel 122. Further, when the GPS reception unit 170 detects the position, the GPS reception unit 170 can also detect the position by referring to the image from the camera unit 141. Further, the optical axis direction of the camera unit 141 of the smartphone 100 can be determined or a current use environment can be determined by referring to the image from the camera unit 141 without using a triaxial acceleration sensor, or in combination with the triaxial acceleration sensor. Of course, the image from the camera unit 141 can also be used within the application software.

In this embodiment, by downloading application software for operating the pan and tilt camera 10 (a remote operation program) over a network or the like, storing the application software in the storage unit 150, and operating the main control unit 101 according to the downloaded application software using the application processing function of the smartphone 100, the general-purpose smartphone 100 functions as a remote operation device for remotely operating the pan and tilt camera 10.

In the touch panel 120, an icon button indicating a cross key that is used when the pan and tilt camera 10 is manually operated to perform a pan operation or a tilt operation, an imaging button for performing an imaging instruction, and the like are displayed. When the icon button indicating the cross key of the touch panel 120 is touched, the main control unit 101 (motor driving instruction output unit) outputs a motor driving instruction to the pan motor and the tilt motor of the pan and tilt device 30 via the wireless communication unit 110. When the imaging button is touched, the main control unit 101 (imaging instruction unit) outputs an imaging instruction for a still image or a moving image to the pan and tilt camera 10.

[Overview of Operation of the Pan and Tilt Camera (Pan and Tilt Mechanism) at Time of Reset]

Figure 4A:
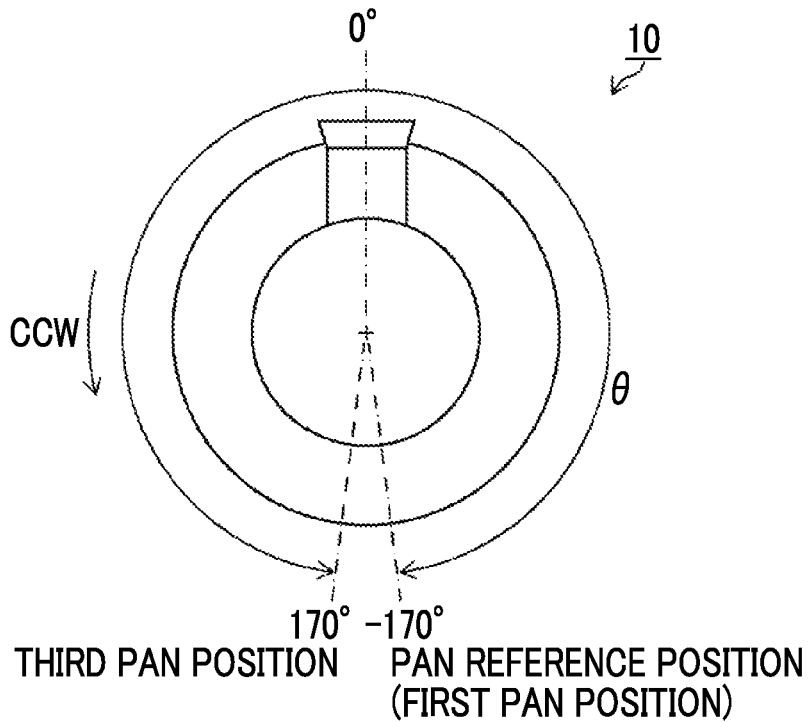
FIGS. 4A and 4B are diagrams illustrating, for example, a movement range in which pan control and tilt control of the pan and tilt camera can be performed.
Figure 4B:
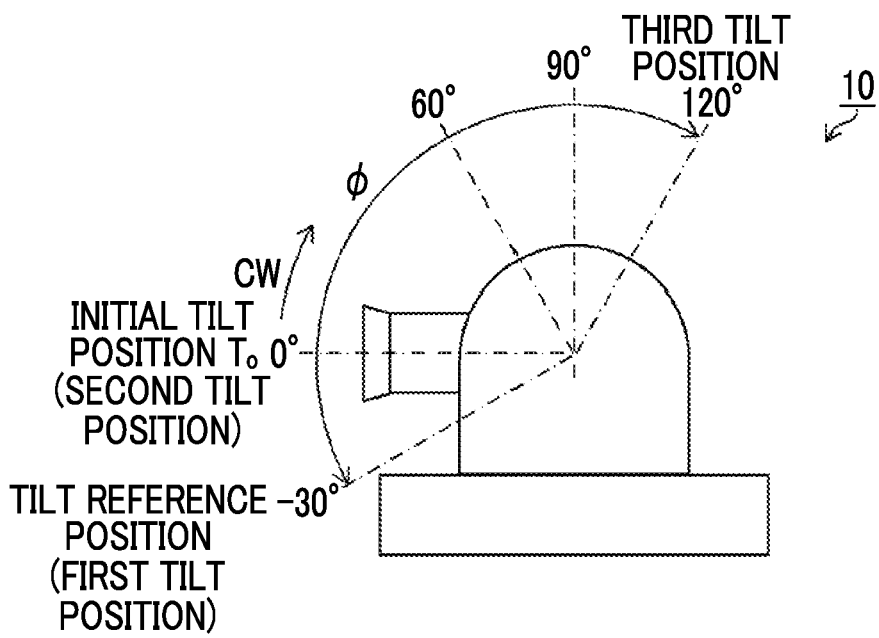

FIGS. 4A and 4B are views illustrating, for example, a movement range in which pan control and tilt control of the pan and tilt camera 10 (pan and tilt mechanism 32) can be performed, FIG. 4A is a plan view of the pan and tilt camera, and FIG. 4B is a side view of the pan and tilt camera 10.

As illustrated in FIG. 4A, in a pan operation of the pan and tilt mechanism 32, a counterclockwise direction (CCW direction) in FIG. 4A is a forward direction, and a pan movement range of a controllable pan angle $\theta$ of the pan and tilt mechanism 32 is 340° from −170° to 170°.

One end (a position of −170°) of the pan movement range is a pan reference position (first pan position), and the other end (a position of 170°) of the pan movement range is a third pan position.

A home position sensor is disposed at the pan reference position, and the home position sensor outputs a detection signal when the pan and tilt mechanism 32 performs a pan operation in the CW direction at the time of reset and reaches the pan reference position.

A position (a position of 0°) of a center of the pan movement range is an initial pan position $P_o$, and the pan and tilt mechanism 32 usually is subjected to pan control so that the pan and tilt mechanism 32 is moved to the initial pan position $P_o$ and waits for at the time of reset.

Further, as illustrated in FIG. 4B, in the tilt operation of the pan and tilt mechanism 32, a clockwise direction (CW direction) is a forward direction in FIG. 4B, and a tilt movement range of the controllable tilt angle $\phi$ of the pan and tilt mechanism 32 is 150° from −30° to 120°.

One end (a position of −30°) of the tilt movement range is a tilt reference position (first tilt position), and the other end (a position of 120°) of the tilt movement range is a third tilt position.

A home position sensor is disposed at the tilt reference position, and the home position sensor outputs a detection signal when the pan and tilt mechanism 32 performs a tilt operation in the CCW direction at the time of reset and reaches the tilt reference position.

A tilt angle (a position of 0°) at which an optical axis of the imaging unit 20 is horizontal (parallel to the camera body 12) is an initial tilt position $T_o$, and the pan and tilt mechanism 32 is usually subjected to tilt control so that the pan and tilt mechanism 32 moves to the initial tilt position $T_o$ and waits for at the time of reset.

FIGS. 5 and 6 are diagrams illustrating a state which the pan and tilt camera 10 is subjected to pan control and tilt control so that the pan and tilt camera 10 (pan and tilt mechanism 32) is moved to the initial pan position $P_o$ and the initial tilt position $T_o$ at the time of reset of the pan and tilt camera 10 (for example, power ON reset).

Figure 5A:
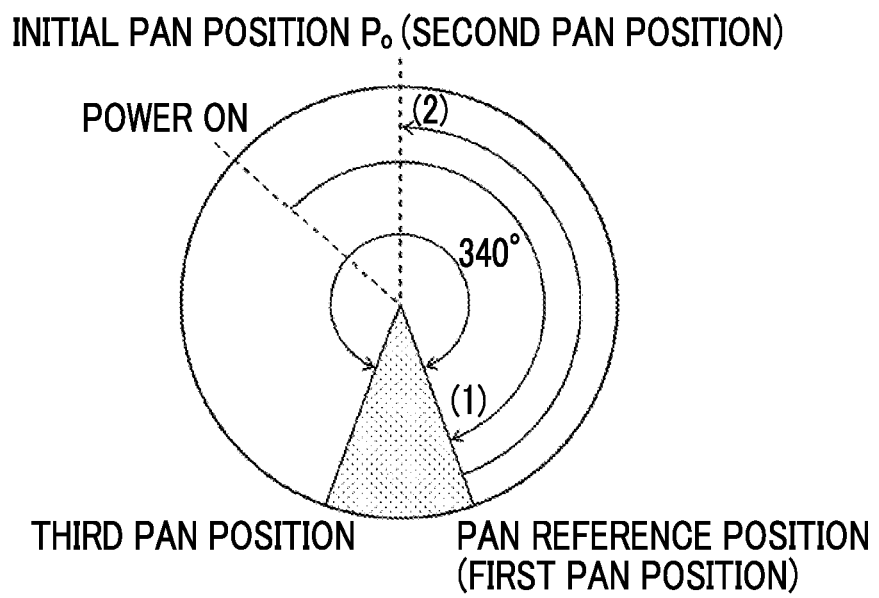
FIGS. 5A and 5B are diagrams illustrating a state in which pan control and tilt control are performed so that a pan and tilt camera moves to an initial pan position and an initial tilt position at the time of reset of the pan and tilt camera.

As illustrated in FIG. 5A, when a pan mechanism of the pan and tilt mechanism 32 receives reset in a state that the pan mechanism is located between the initial pan position $P_o$ and the third pan position, the pan mechanism rotates the pan motor (first stepping motor) that drives the pan and tilt mechanism 32 in a first preset rotation direction to cause the pan and tilt mechanism 32 to perform a pan operation in the CW direction until the pan and tilt mechanism 32 reaches the pan reference position.

Figure 5B:
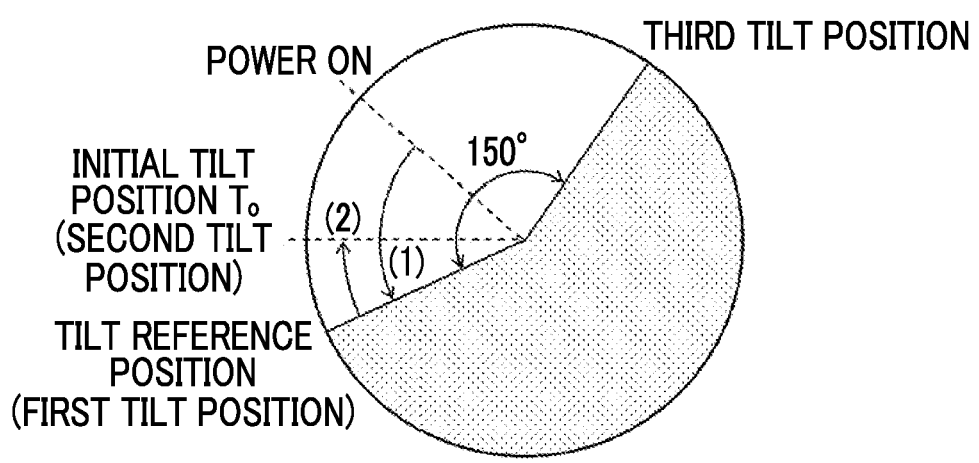

Similarly, as illustrated in FIG. 5B, when a tilt mechanism of the pan and tilt mechanism 32 receives reset in a state that the tilt mechanism is located between the initial tilt position $T_o$ and the third tilt position, the tilt mechanism rotates the tilt motor (second stepping motor) that drives the pan and tilt mechanism 32 in a first preset rotation direction to cause the pan and tilt mechanism 32 to perform a tilt operation in the CCW direction until the pan and tilt mechanism 32 reaches the tilt reference position.

A movement of the pan and tilt mechanism 32 until the pan and tilt mechanism 32 reaches the pan reference position and the tilt reference position after receiving the reset as described above is hereinafter referred to as a first movement (1).

Then, when the pan and tilt mechanism 32 reaches the pan reference position and the tilt reference position, the pan motor (first stepping motor) and the tilt motor (second stepping motor) are rotated in a second rotation direction opposite to the first rotation direction, and the pan and tilt mechanism 32 is moved toward the initial pan position $P_o$ and the initial tilt position $T_o$.

A movement of the pan and tilt mechanism 32 from the pan reference position to the initial pan position $P_o$ and from the tilt reference position to the initial tilt position $T_o$ is hereinafter referred to as a second movement (2).

Figure 6A:
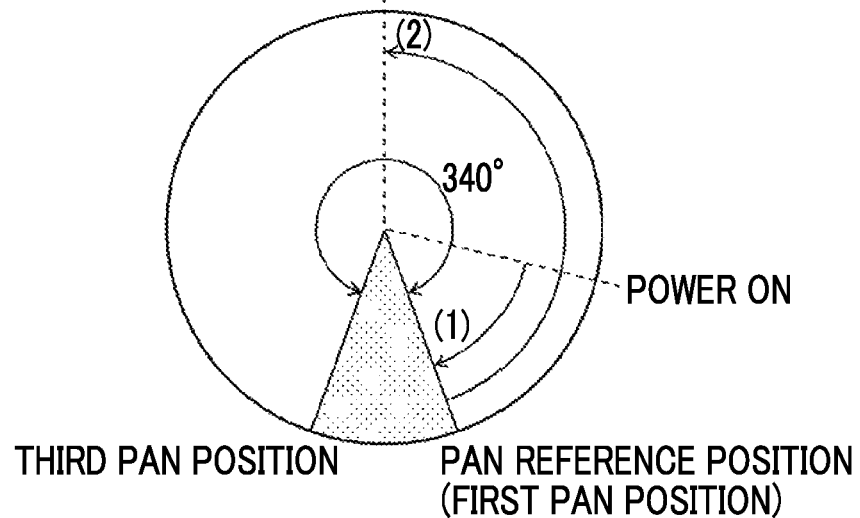
FIGS. 6A and 6B are other diagrams illustrating a state in which pan control and tilt control are performed so that a pan and tilt camera moves to an initial pan position and an initial tilt position at the time of reset of the pan and tilt camera.
Figure 6B:
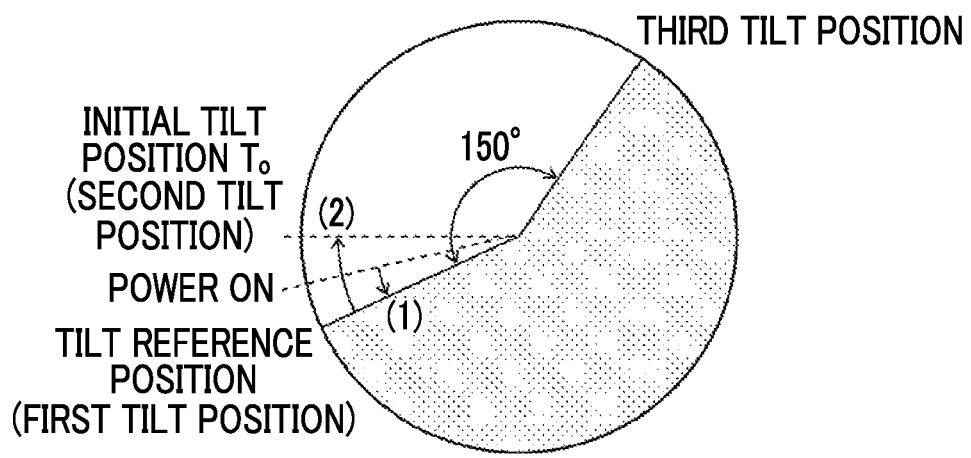

FIGS. 6A and 6B are different from FIGS. 5A and 5B in the position of the pan and tilt mechanism 32 when the reset is received.

That is, the pan mechanism of the pan and tilt mechanism 32 when the reset is received is located between the initial pan position $P_o$ and the first pan position (FIG. 6A), and the tilt mechanism of the pan and tilt mechanism 32 is located between the initial tilt position $T_o$ and the first tilt position (FIG. 6B).

Figure 7:
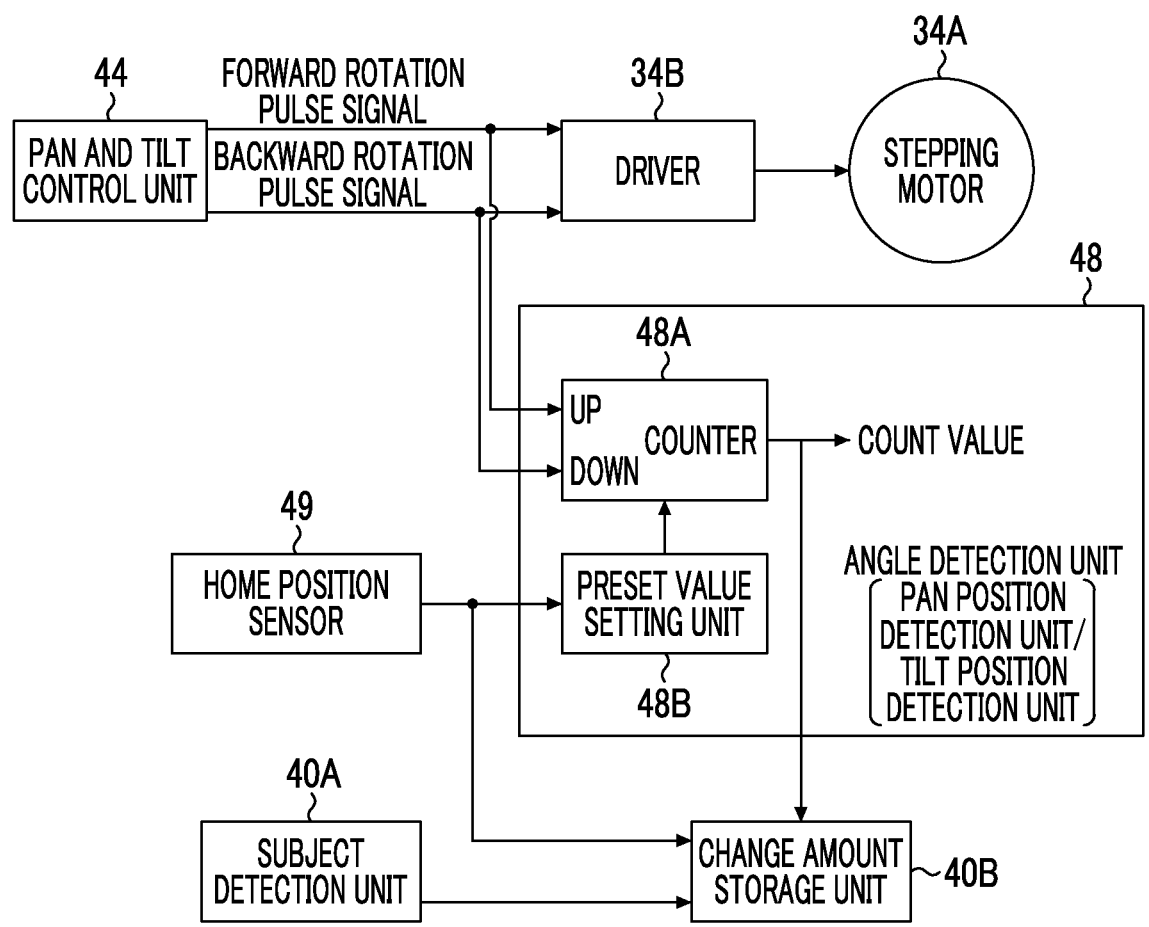
FIG. 7 is a diagram illustrating a configuration of an angle detection unit and a peripheral portion thereof.

FIG. 7 is a diagram illustrating a configuration of the angle detection unit 48 and a peripheral portion thereof. The angle detection unit 48 includes a pan position detection unit and a tilt position detection unit, but since the pan position detection unit and the tilt position detection unit can be configured as the same units, only the pan position detection unit will be described herein. Further, a stepping motor 34A and a driver 34B are intended for the pan driving unit 34.

The pan and tilt control unit 44 applies a forward rotation pulse signal or a reverse rotation pulse signal for rotating the stepping motor 34A in a forward or reverse direction on the basis of the motor driving instruction input via the camera work control unit 46 to the stepping motor 34A via the driver 34B.

The angle detection unit 48 includes a counter 48A (first counter) and a preset value setting unit 48B. The counter 48A is a counter that up-down counts the number of pulses of the forward rotation pulse signal and the reverse rotation pulse signal output from the pan and tilt control unit 44. In this example, the counter 48A counts up the number of pulses of the forward rotation pulse signal, and counts down the number of pulses of the reverse rotation pulse signal.

The preset value setting unit 48B presets the predetermined reference value (first reference value) as a count value of the counter 48A when the pan and tilt mechanism 32 reaches the pan reference position (first pan position). The home position sensor 49 detects a point in time when the pan and tilt mechanism 32 reaches the pan reference position during the first movement (1) of the pan and tilt mechanism 32 illustrated in FIGS. 5A and 5B or the like. When the preset value setting unit 48B receives a detection signal from the home position sensor 49, the preset value setting unit 48B presets the count value of the counter 48A to a first reference value. The first reference value is a count value corresponding to the pan angle θ of −170° (see FIG. 4A), and the count value of the counter 48A after the first reference value is preset indicates a current pan angle θ (pan position) of the pan and tilt mechanism 32.

When the subject detection unit 40A detects a subject during the first movement (1) of the pan and tilt mechanism 32, a change amount storage unit 40B acquires a count value of the counter 48A at a point in time of the detection. Then, when the change amount storage unit 40B receives a detection signal indicating that the pan and tilt mechanism 32 reaches the pan reference position from the home position sensor 49, the change amount storage unit 40B acquires the count value of the counter 48A immediately before the preset. The change amount (difference value) of the acquired count value is stored as a change amount in the pan direction (corresponding to a change amount of a pan angle) until the pan and tilt mechanism 32 is moved to the pan reference position after the subject is detected during the first movement (1).

The tilt position detection unit is also configured similarly to the pan position detection unit illustrated in FIG. 7, and when the pan and tilt mechanism 32 reaches the tilt reference position (first tilt position), the preset value setting unit 48B presets a predetermined reference value (second reference value) as the count value of the counter 48A. The second reference value is a count value corresponding to the tilt angle φ of −30° (see FIG. 4B), and the count value of the counter 48A after the second reference value is preset indicates the current tilt angle φ (tilt position) of the pan and tilt mechanism 32.

[Method of Setting Initial Position of the Pan and Tilt Camera]

Figure 8:
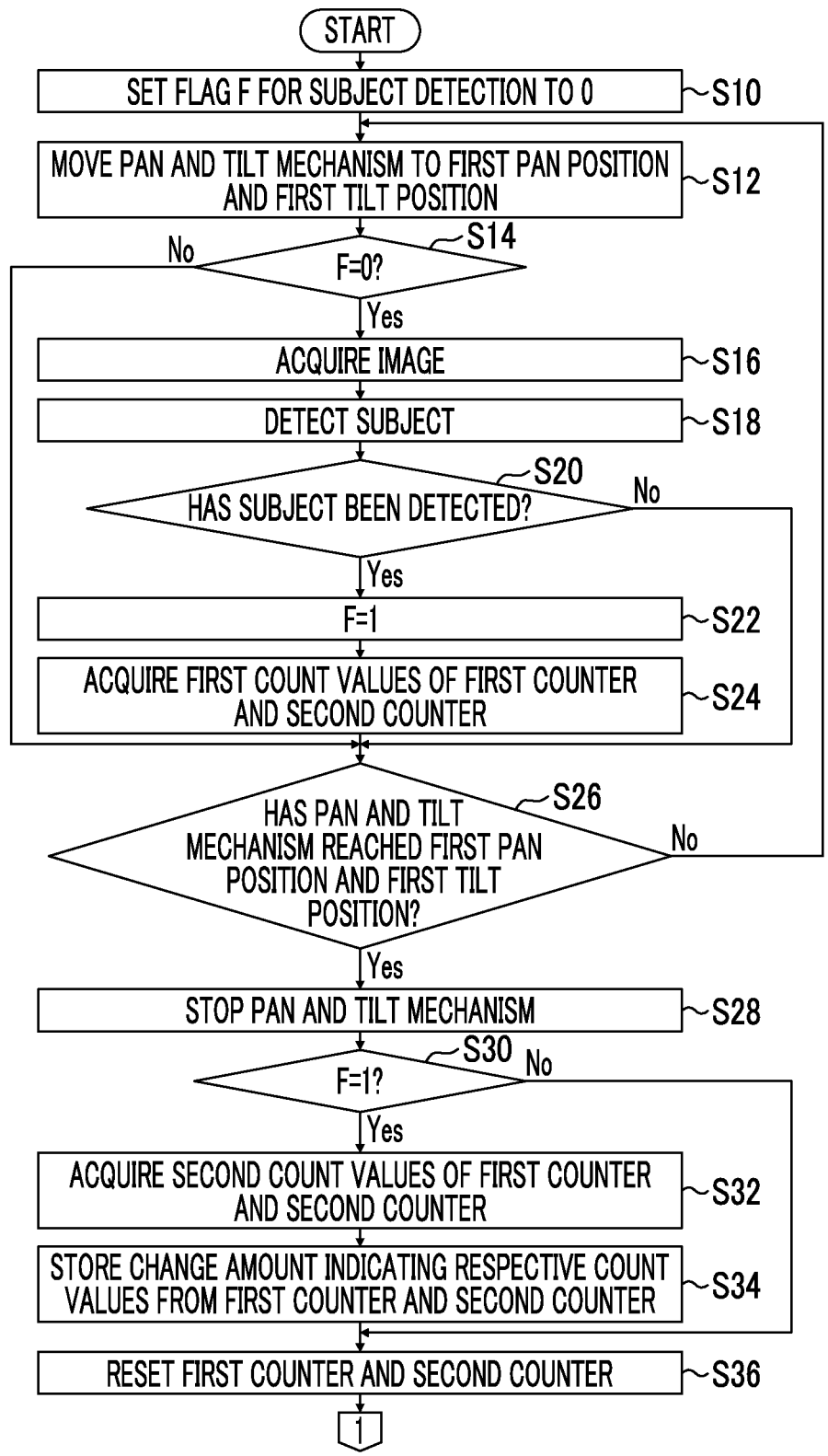
FIG. 8 is a part of a flowchart illustrating a first embodiment of a method of setting an initial position of a pan and tilt camera according to the present invention.
Figure 9:
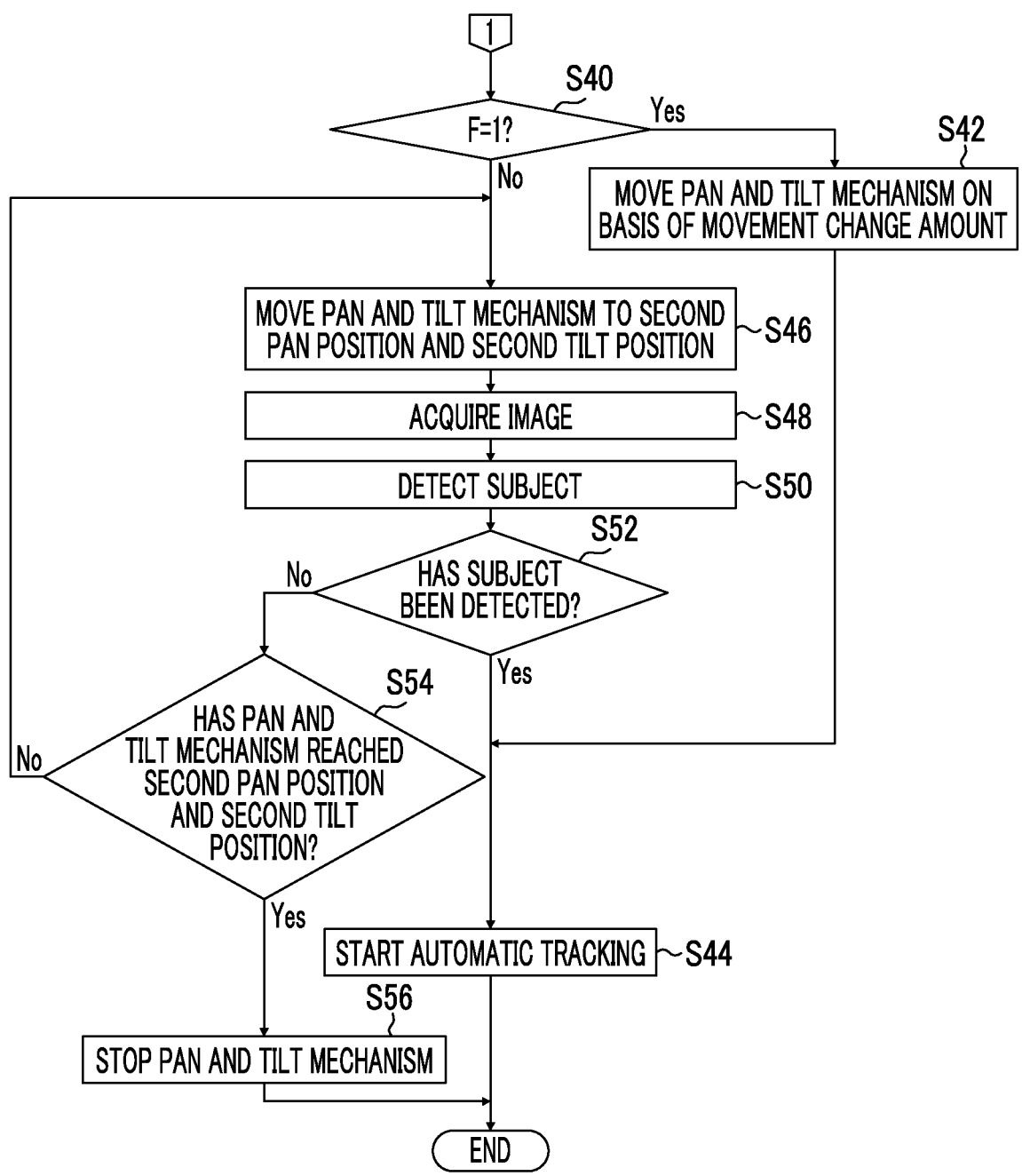
FIG. 9 is another part of the flowchart illustrating the first embodiment of a method of setting an initial position of a pan and tilt camera according to the present invention.

FIGS. 8 and 9 are flowcharts illustrating a first embodiment of a method of setting an initial position of a pan and tilt camera according to the present invention.

When reset (for example, power ON reset) of the pan and tilt camera 10 is received, capturing of a moving image by the imaging unit 20 and detection of the subject by the subject detection unit are started and a process that will be shown below is started.

As illustrated in FIG. 8, the control unit 40 sets a flag F for subject detection indicating whether or not the subject is detected to 0 (F=0) (step S10), and then, moves the pan and tilt mechanism 32 to the first pan position (pan reference position) and the first tilt position (tilt reference position) (step S12). This movement (first movement (1)) is performed by rotating the pan motor (first stepping motor) and the tilt motor (second stepping motor) in a first preset rotation direction.

Then, it is determined whether or not the flag F is 0 (step S14), and in a case where the flag F is 0 ("Yes"), the control unit 40 acquires one current frame (image) of a moving image captured by the imaging unit 20 (step S16), and performs detection of the subject for automatic tracking (step S18). In a case where the subject for automatic tracking is a face of a person, the face of the person is detected from the image, and in a case where the subject for automatic tracking is a moving body, the moving body is detected on the basis of a difference image between preceding and subsequent images.

Subsequently, it is determined whether or not the subject has been detected (step S20), and in a case where the subject is detected ("Yes"), the flag F is set to 1 (step S22), and first count values of the respective counters (the first counter and the second counter) of the pan position detection unit and the tilt position detection unit constituting the angle detection unit 48 are acquired (step S24).

On the other hand, in step S20, in a case where the subject is not detected ("No"), the process transitions to step S26.

In step S26, the control unit 40 determines whether or not the pan and tilt mechanism 32 has reached the first pan position (pan reference position) and the first tilt position (tilt reference position). This determination is performed on the basis of a detection output of the home position sensor that detects the first pan position and the first tilt position.

In step S26, in a case where it is determined that the pan and tilt mechanism 32 has not reached the first pan position and the first tilt position ("No"), the process transition to step S12, and the process from step S12 to step S26 is repeated.

In step S26, in a case where it is determined that the pan and tilt mechanism 32 has reached the first pan position and the first tilt position ("Yes"), the pan and tilt mechanism 32 is stopped (step S28).

Subsequently, it is determined whether the flag F is set to 1 (step S30). Here, in a case where the flag F is set to 1, this means that the subject has been detected during a movement (first movement (1)) of the pan and tilt mechanism 32 to the first pan position and the first tilt position after the pan and tilt mechanism 32 receives the reset.

When the flag F is set to 1, the control unit 40 acquires count values (second count values) of the first counter and the second counter of the pan position detection unit and the tilt position detection unit (step S32), and stores a change amount indicating a difference value between the first count value and the second count value acquired in step S24 in the change amount storage unit (step S34). The change amount indicating a difference value between the first count value and the second count value corresponds to a movement amount in the pan direction and the tilt direction of the pan and tilt mechanism until the pan and tilt mechanism reaches the first pan position and the first tilt position from a detection point in time at which the subject is detected during the first movement (1).

Subsequently, the control unit 40 presets the respective count values of the first counter and the second counter to the first reference value (a value corresponding to the pan angle) −170° and the second reference value (a value corresponding to the tilt angle −30°) (step S36).

Then, as illustrated in FIG. 9, the control unit 40 determines whether or not the flag F is 1 (step S40). In a case where the flag F is 1 ("Yes"), the subject has been detected during the first movement (1), and the change amounts of the respective count values of the first counter and the second counter until the pan and tilt mechanism 32 reaches the first pan position and the first tilt position from a point in time at which the subject has been detected are stored in the change amount storage unit. Accordingly, the control unit 40 drives and controls the pan and tilt mechanism 32 on the basis of the change amounts stored in the change amount storage unit to move the pan and tilt mechanism 32 to a position at which the subject has been detected during the first movement (1) (step S42).

If the pan and tilt mechanism 32 moves to the position at which the subject has been detected during the first movement (1), then the control unit 40 starts automatic tracking to automatically track the subject (step S44). That is, when the automatic tracking is started and transition to an automatic tracking state occurs, the subject detection unit detects the subject from continuously captured images, and the control unit 40 (automatic tracking control unit) controls the pan operation and the tilt operation of the pan and tilt mechanism 32 so that the subject is located at a center of the captured image on the basis of a position in the image of the subject detected by the subject detection unit.

If the movement amount of the subject within a time until the pan and tilt mechanism 32 moves (returns) to the position at which the subject has been detected from the point in time at which the subject has been detected is within a range of an angle of view when the subject has been detected, it is possible to immediately detect the subject and perform automatic tracking, and it is possible to narrow down a search range of the subject, cause the pan and tilt mechanism 32 to perform the pan operation and the tilt operation, and detect the subject even when the subject moves beyond the range of the angle of view when the subject has been detected. Further, when the pan and tilt mechanism 32 starts the movement to the position at which the subject has been detected, the detection of the subject is also immediately started. When the subject is detected, transition to the automatic tracking state may be immediately performed.

On the other hand, in step S40, when it is determined that the flag F is not 1 ("No"), the pan and tilt mechanism 32 stopped in step S28 is moved to the second pan position (initial pan position $P_o$) and the second tilt position (initial tilt position $T_o$) (step S46).

During the movement (second movement (2)), the control unit 40 acquires one current frame (image) of a moving image to be captured by the imaging unit 20 (step S48), and performs detection of the subject for automatic tracking (step S50).

Subsequently, it is determined whether the subject has been detected (step S52), and in a case where the subject has been detected ("Yes"), the control unit 40 stops the second movement (2) and immediately starts automatic tracking (step S44).

On the other hand, in step S52, when it is determined that the subject has not been detected ("No"), it is determined whether or not the pan and tilt mechanism 32 has reached the second pan position and the second tilt position (step S54). When it is determined that the pan and tilt mechanism 32 has not reached the second pan position and the second tilt position ("No"), the process transitions to step S46 and the process from step S46 to step S54 is repeated until the subject is detected.

Further, in step S54, when it is determined that the pan and tilt mechanism 32 has reached the second pan position and the second tilt position ("Yes"), the pan and tilt mechanism 32 is stopped (step S56). In this case, the pan and tilt mechanism 32 stops at the second pan position (initial pan position $P_o$) and the second tilt position (initial tilt position $T_o$) and waits for.

Figure 10:
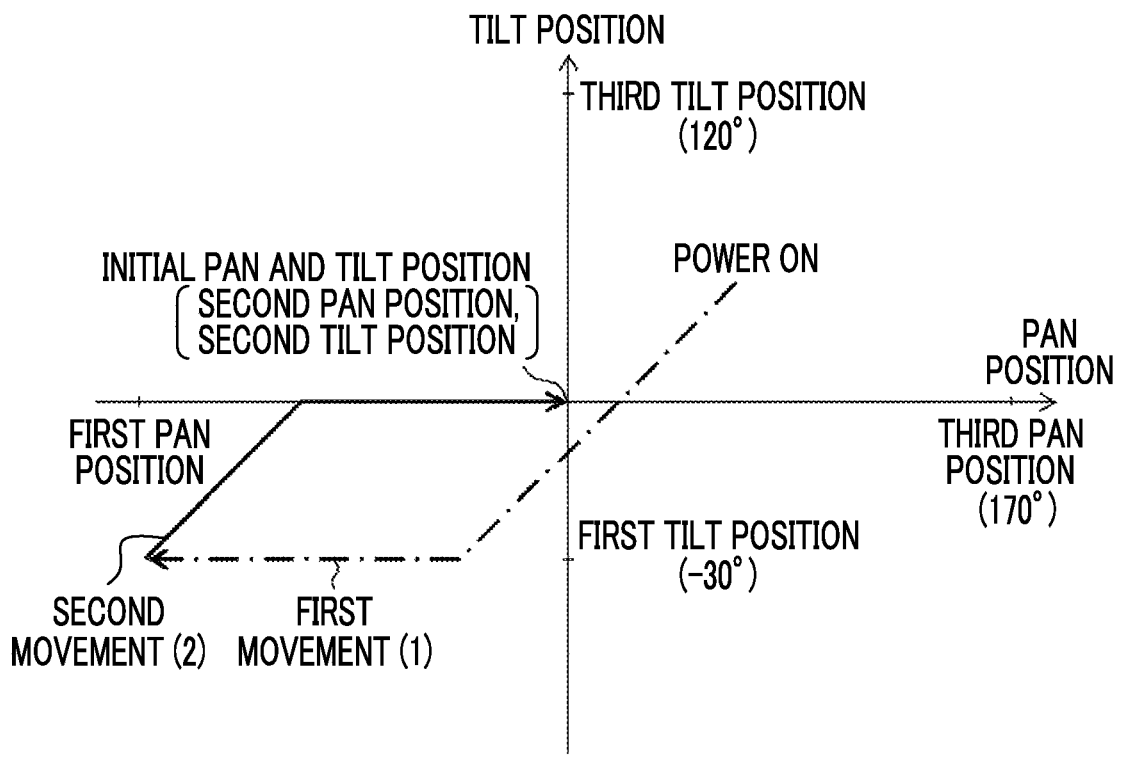
FIG. 10 is a graph showing a pan position and a tilt position of the pan and tilt mechanism, and is a diagram illustrating an example of a movement path of the pan and tilt mechanism when power is ON in a state that the pan and tilt mechanism is present at a position in a first quadrant.

FIG. 10 is a graph showing the pan position and the tilt position of the pan and tilt mechanism 32, and illustrates an example of a movement path of the pan and tilt mechanism 32 when the pan and tilt mechanism 32 is turned ON (power on reset) in a state in which the pan and tilt mechanism 32 is arbitrarily present at the pan position and the tilt position (a position in a first quadrant of the graph of FIG. 10).

When the power is ON as illustrated in FIG. 10, the pan and tilt mechanism 32 is moved to the first pan position and the first tilt position. The movement (first movement (1)) in this case is indicated by an alternate long and short dash line.

Thereafter, the pan and tilt mechanism 32 is moved to the second pan position and the second tilt position that are initial pan and tilt positions. The movement (second movement (2)) in this case is indicated by a solid line.

In the first embodiment illustrated in FIGS. 8 and 9, in a case where the subject is detected during the first movement (1), the pan and tilt mechanism 32 is moved to the first pan position and the first tilt position and then returned to the position at which the subject is detected, and transition to an automatic tracking state is caused to occur.

In a case where the subject is not detected during the first movement (1) and the subject is detected during the second movement (2), transition to an automatic tracking state is immediately caused to occur.

In the first movement (1) and the second movement (2), movement paths are different, and in a case where a position of the pan and tilt mechanism 32 when the power is ON is as illustrated in, for example, FIGS. 5A and 5B, the subject may be able to be detected in the first movement (1) even in a case where the subject cannot be detected during the second movement (2). On the other hand, in the case illustrated in FIGS. 6A and 6B, the subject may be able to be detected in the second movement (2) even in a case where the subject cannot be detected during the first movement (1).

The present invention is not limited to the first embodiment, and the detection of the subject is performed only during any one of the first movement (1) and the second movement (2), and in a case where the subject is detected, transition to the automatic tracking state may be caused to occur on the basis of a result of the detection.

[Second Embodiment of Method of Setting an Initial Position of a Pan and Tilt Camera According to the Present Invention]

Figure 11:
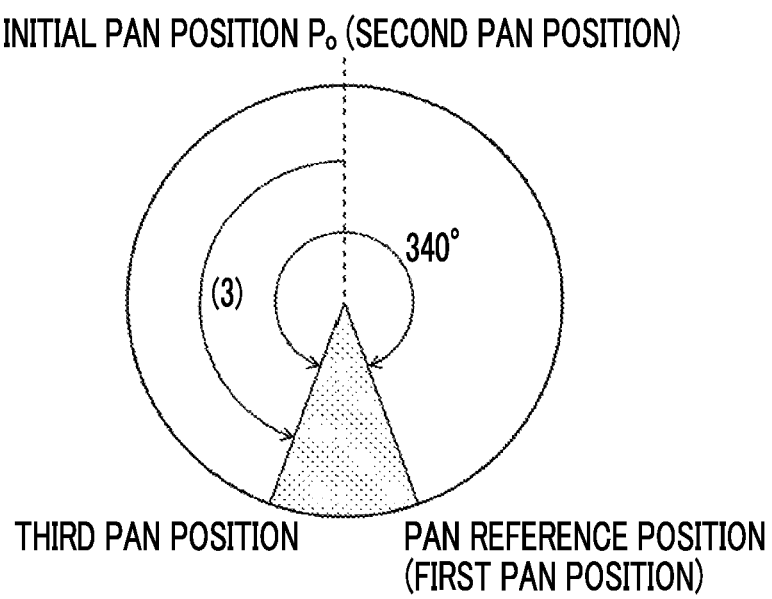
FIG. 11 is a diagram used to describe a second embodiment of the method of setting an initial position of a pan and tilt camera according to the present invention.
Figure 12:
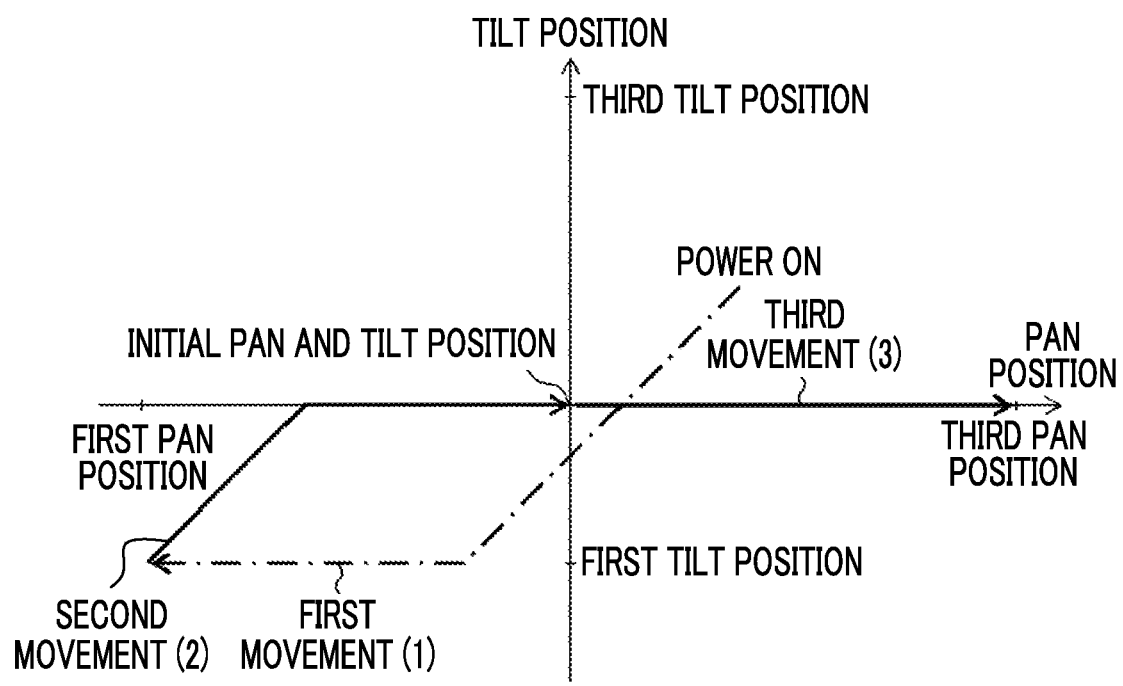
FIG. 12 is another diagram used to describe the second embodiment of the method of setting an initial position of a pan and tilt camera according to the present invention.

FIGS. 11 and 12 are diagrams used to describe a second embodiment of the method of setting an initial position of a pan and tilt camera according to the present invention, and illustrate a case where a subject is not detected in the first embodiment.

That is, in the first embodiment, in a case where the subject is not detected in either the first movement (1) or the second movement (2), the pan and tilt mechanism 32 stops at the second pan position (initial pan position $P_o$) and the second tilt position (initial tilt position $T_o$) and enters a standby state.

On the other hand, in the second embodiment, the pan and tilt mechanism 32 does not wait for at the initial pan position as illustrated in FIG. 11, and continues to perform the pan operation toward the third pan position. That is, the pan and tilt mechanism 32 continues to rotate the pan motor in the same direction as the rotation direction (second rotation direction) of the pan motor at the time of movement from the pan reference position to the initial pan position, and moves the pan and tilt mechanism from the pan reference position to the third pan position.

On the other hand, the tilt motor stops and the tilt position of the pan and tilt mechanism 32 holds a state of the initial tilt position.

A movement until the pan motor reaches the third pan position due to continuing to rotate only the pan motor in the second rotation direction from the pan reference position and the tilt reference position as described above is hereinafter referred to as a third movement (3).

FIG. 12 is a graph in which the third movement (3) is added in FIG. 11.

In the second embodiment, detection of the subject is performed during the third movement (3), and in a case where the subject is detected, transition to an automatic tracking state is caused to occur.

On the other hand, the method in a case where the subject is not detected during the third movement (3), there are a method in which the pan and tilt mechanism 32 returns to the pan reference position and the tilt reference position and waits for here, and a method of performing detection of the subject.

[Third Embodiment of Method of Setting an Initial Position of a Pan and Tilt Camera According to the Present Invention]

Figure 13:
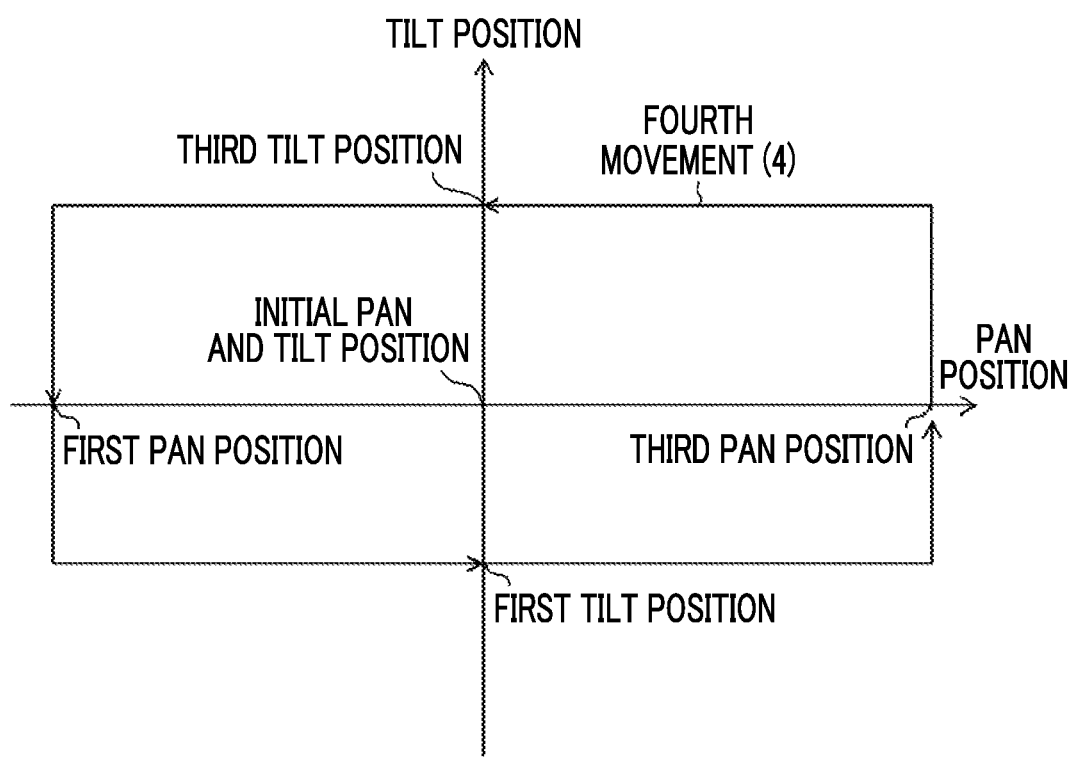
FIG. 13 is a diagram used to describe a third embodiment of the method of setting an initial position of a pan and tilt camera according to the present invention.

FIG. 13 is a diagram used to describe a third embodiment of the method of setting an initial position of a pan and tilt camera according to the present invention, and illustrate a case where detection of a subject is performed again in a case where the subject is not detected in the second embodiment.

That is, as illustrated in FIG. 13, after the pan position of the pan and tilt mechanism 32 reaches the third pan position, the tilt position of the pan and tilt mechanism 32 is moved from the tilt reference position to the third tilt position, and then, the pan position of the pan and tilt mechanism 32 is moved from the third pan position to the first pan position.

When the pan position of the pan and tilt mechanism 32 reaches the first pan position, the tilt position of the pan and tilt mechanism 32 is moved from the third tilt position to the first tilt position, and then, the pan position of the pan and tilt mechanism 32 is moved from the first pan position to the third pan position.

Then, the tilt position of the pan and tilt mechanism 32 is moved from the first tilt position to the tilt reference position.

By alternately repeating the tilt operation and the pan operation of the pan and tilt mechanism 32 as described above, the pan and tilt mechanism 32 performs a fourth movement (4) in a rectangular shape on the graph illustrated in FIG. 13.

In the third embodiment, detection of the subject is performed during the fourth movement (4), and in a case where the subject is detected, the transition to an automatic tracking state is caused to occur.

On the other hand, in a case where the subject is not detected during the fourth movement (4), it is preferable that the pan and tilt mechanism 32 returns to the pan reference position and the tilt reference position again and waits for here.

[Modification Example of the Third Embodiment of the Method of Setting an Initial Position of a Pan and Tilt Camera According to the Present Invention]

Figure 14:
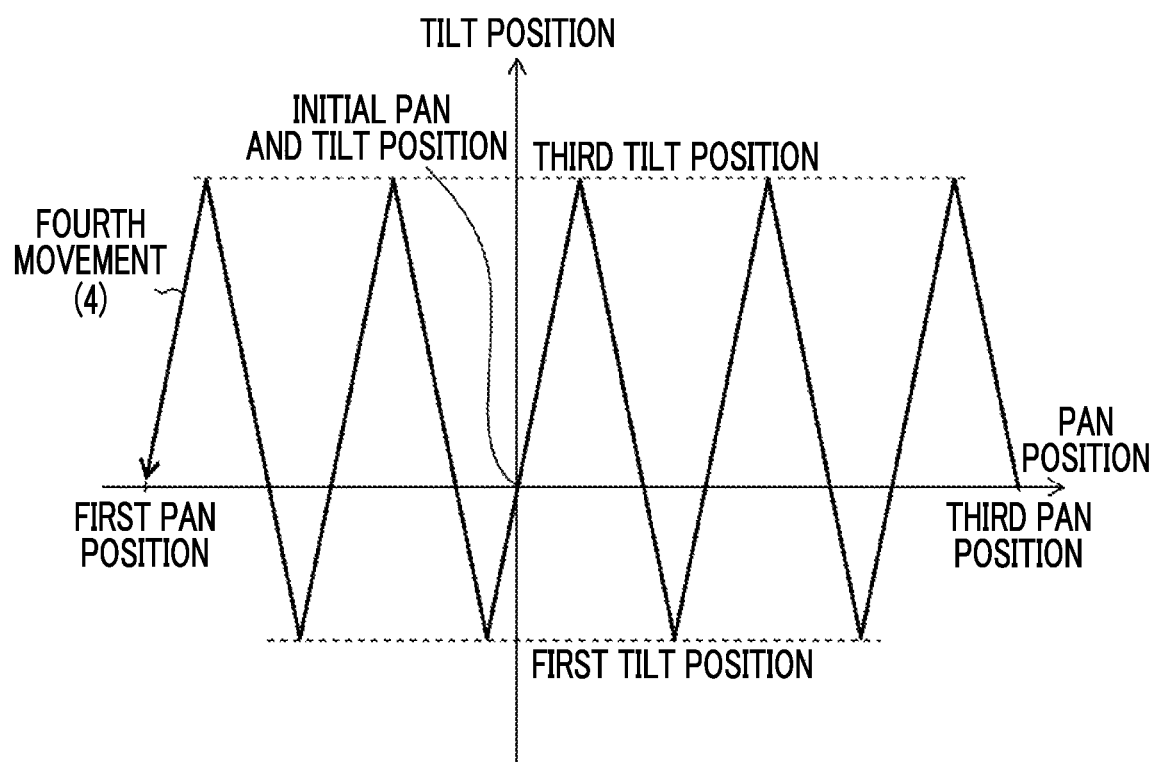
FIG. 14 is a diagram used to describe a modification example of the third embodiment of the method of setting an initial position of a pan and tilt camera according to the present invention.

FIG. 14 is a diagram used to describe a modification example of the third embodiment of the method of setting an initial position of a pan and tilt camera according to the present invention, and the modification example is different the third embodiment in a movement path (movement method) of a fourth movement (4).

That is, as illustrated in FIG. 14, after the pan position of the pan and tilt mechanism 32 reaches the third pan position, the pan position of the pan and tilt mechanism 32 is moved from the third pan position to the first pan position, the tilt position of the pan and tilt mechanism 32 is moved from the tilt reference position to the third tilt position and then moved from the third tilt position to the first tilt position so that the movement of the first tilt position→the third tilt position→the first tilt position: is repeatedly performed.

Accordingly, as illustrated in FIG. 14, the movement path of the fourth movement (4) becomes in a zigzag shape, and it is possible to detect the subject substantially over the entire area in which imaging can be performed by a pan and tilt operation of the pan and tilt mechanism 32 by performing detection of the subject during the fourth movement (4).

On the other hand, if the subject is not detected during the fourth movement (4), it is preferable for the pan and tilt mechanism 32 to return to the pan reference position and the tilt reference position again and to wait for here.

In each embodiment, in a case where the subject cannot be detected during the first movement (1), the second movement (2), the third movement (3), or the fourth movement (4), the pan and tilt mechanism 32 moves to the pan reference position and the tilt reference position and waits for, but a movement to a desired pan position and a desired tilt position of the pan and tilt mechanism 32 or a movement to a pan position and a tilt position at which a subject for automatic tracking can be imaged can be performed by remotely the pan and tilt camera 10 through an operation of the cross key or the like displayed on the touch panel of the smartphone 100.

Further, it is also possible to perform power ON/OFF, reset, an imaging instruction, and the like of the pan and tilt camera 10 using the smartphone 100.

Next, an application example of the pan and tilt camera system including the pan and tilt camera 10 and the smartphone 100 will be described.

For example, in a case where self-imaging is performed, the pan and tilt camera 10 is attached to a tripod or the like or placed on a table or the like, and the power is ON. The pan and tilt camera 10 performs, for example, the first movement (1) and the second movement (2) to move the pan and tilt mechanism 32 to the pan reference position and the tilt reference position at the time of power ON reset through power ON, performs the detection of the subject (a person to be imaged) for auto-tracking during a movement such as the first movement (1) or the second movement (2), and transitions to the automatic tracking state when the subject is detected.

In a case where the pan and tilt camera 10 transitions to the automatic tracking state, a person to be imaged who desires to perform self-imaging immediately transmits an imaging instruction or the like from the smartphone 100 to perform self-imaging (capturing of a still image or moving image).

[Others]

In this embodiment, the detection of the first pan position (pan reference position) and the first tilt position (tilt reference position) of the pan and tilt mechanism is detected by the home position sensor, but the present invention is not limited thereto and a predetermined driving instruction beyond the pan movement range and the tilt movement range may be applied to the pan and tilt mechanism, and the pan and tilt mechanism may be brought into contact with a mechanical end portion so that the pan position and the tilt position of the pan and tilt mechanism after the predetermined driving instruction is applied are detected as the first pan position (pan reference position) and the first tilt position (tilt reference position).

Further, the pan movement range and the tilt movement range, the second pan position (initial pan position), and the second tilt position (initial tilt position) of the pan and tilt mechanism are not limited to the embodiment illustrated in FIGS. 4A and 4B and can be appropriately designed.

Further, the remote operation device of the pan and tilt camera is not limited to the smartphone in which a program for a remote operation is installed, and the program for remote operation may be installed in a portable terminal such as a tablet terminal having a touch panel or a personal digital assistant (PDA) and the portable terminal may be applied as a remote operation device, the remote operation device may be a dedicated remote operation device, and the pan and tilt camera and the remote operation device are not limited to being wirelessly connected and may be connected using a wire.

Further, the present invention is not limited to the above-described embodiments, and it is understood that various modifications can be made without departing from the spirit of the present invention.

EXPLANATION OF REFERENCES

10: pan and tilt camera
20: imaging unit
22: imaging lens
24: imaging element
30: pan and tilt device
32: pan and tilt mechanism
34: pan driving unit
34A: stepping motor
36: tilt driving unit
40: control unit
40A: subject detection unit
40B: change amount storage unit
41: signal processing unit
42: imaging control unit
43: lens control unit
44: pan and tilt control unit
46: camera work control unit
50, 48: angle detection unit
48A: counter
48B: preset value setting unit
49: home position sensor
110: wireless communication unit
60, 140: operation unit
62: memory
100: smartphone
101: main control unit
120: display input unit (touch panel)
121: display panel
122: operation panel
150: storage unit

The invention claimed is:

1. A method of setting an initial position of a camera, the camera including an imaging unit including an imaging lens and an imaging element, and a pan mechanism, including a stepping motor, that rotates the imaging unit in a pan direction with respect to a camera body, the method comprising:
a step of performing a first rotation of the pan mechanism to a first pan position in a first preset rotation direction when a reset of the camera is received;
a step of performing a second rotation of the pan mechanism toward a second pan position in a second rotation direction opposite to the first rotation direction; and
a step of, when a subject for automatic tracking is detected on the basis of an image captured by the camera during the second rotation of the pan mechanism, repeatedly executing driving of the pan mechanism based on the detection of the subject and a result of the detection to automatically track the subject.

2. The method according to claim 1, further comprising a step of, when the subject is not detected during the second rotation of the pan mechanism, stopping the pan mechanism at the second pan position.

3. The method according to claim 1, further comprising:
a step of, when the subject is not detected during the second rotation of the pan mechanism, continuing to rotate the pan mechanism in the second rotation direction to perform a third rotation of the pan mechanism from the second pan position toward a third pan position; and
a step of, when the subject is detected during the third rotation of the pan mechanism, repeatedly executing driving of the pan mechanism based on the detection of the subject and a result of the detection to automatically track the subject.

4. The method according to claim 1, wherein the subject for automatic tracking is a face of a person, and the step of detecting a subject for automatic tracking includes detecting the face of the person from within the image captured by the camera.

5. The method according to claim 1, wherein the subject for automatic tracking is a moving body, and the step of detecting a subject for automatic tracking includes detecting the moving body from the images continuously captured by the camera.

6. A camera, comprising:
an imaging unit including an imaging lens and an imaging element;
a pan mechanism, including a stepping motor, that rotates the imaging unit in a pan direction with respect to a camera body;
an input unit, including a reset button, that receives reset; and
a controller configured to:
operate the imaging unit to continuously acquire an image from the imaging unit when receiving the reset using the input unit;
detect a subject for automatic tracking on the basis of the image that is acquired;
control the pan mechanism to move the imaging unit to an initial position when receiving the reset using the input unit; and
control the pan mechanism to automatically track the subject on the basis of a position in the image of the subject that is detected,
wherein the controller performs a first rotation of the pan mechanism in a first preset rotation direction to a first pan position when receiving the reset using the input unit, performs a second rotation of the pan mechanism in a second rotation direction opposite to the first rotation direction toward a second pan position, and performs switching to automatic tracking by the controller when the controller detects the subject during the second rotation of the pan mechanism.

7. The camera according to claim 6, wherein:
the stepping motor drives the pan mechanism,
the controller includes a counter that up-down counts the number of pulses of a pulse signal of the first rotation direction and a pulse signal of the second rotation direction to be applied to the stepping motor, and detects a position in the pan direction of the pan mechanism on the basis of a count value of the counter, and
wherein the controller presets a count value of the counter to a preset reference value when the pan mechanism reaches the first pan position.

8. A camera system, comprising:
the camera according to claim 6; and
a remote operation device wirelessly or wiredly connected to the camera to remotely operate the camera, the remote operation device including a wireless communication unit that acquires a live view image from the camera, a display that displays the live view image that is acquired, a microprocessor configured to manually operate the pan mechanism, a driving instruction output unit, including a motor, that outputs a driving instruction to the pan mechanism on the basis of the manual operation, the microprocessor further configured to output an imaging instruction for a still image or a moving image to the camera.

* * * * *